United States Patent
Yoshizumi et al.

(10) Patent No.: US 8,194,272 B2
(45) Date of Patent: Jun. 5, 2012

(54) PRINTING DEVICE, PRINTING SYSTEM, AND COMPUTER PROGRAM PRODUCT

(75) Inventors: Takeshi Yoshizumi, Tokyo (JP); Hozumi Yonezawa, Tokyo (JP); Hiroshi Gotoh, Tokyo (JP); Takahiro Hirakawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 464 days.

(21) Appl. No.: 12/429,312

(22) Filed: Apr. 24, 2009

(65) Prior Publication Data

US 2009/0310175 A1  Dec. 17, 2009

(30) Foreign Application Priority Data

Jun. 12, 2008  (JP) .................................. 2008-154190

(51) Int. Cl.
*G06F 3/12* (2006.01)
(52) U.S. Cl. ...................... 358/1.15; 358/1.13; 358/1.14
(58) Field of Classification Search ......... 358/1.13–1.16
See application file for complete search history.

(56) References Cited

U.S. PATENT DOCUMENTS

| | | | |
|---|---|---|---|
| 6,912,061 B1 * | 6/2005 | Ozaki | 358/1.15 |
| 7,027,169 B1 | 4/2006 | Morikawa et al. | |
| 2001/0048833 A1 * | 12/2001 | Katsuda et al. | 400/76 |
| 2004/0252322 A1 * | 12/2004 | Gassho et al. | 358/1.14 |
| 2005/0128512 A1 * | 6/2005 | Kurotsu | 358/1.15 |
| 2006/0146360 A1 * | 7/2006 | Simonds et al. | 358/1.15 |
| 2006/0244991 A1 | 11/2006 | Tenger et al. | |
| 2006/0274370 A1 * | 12/2006 | Shima | 358/1.15 |
| 2007/0024895 A1 * | 2/2007 | Clark | 358/1.15 |
| 2007/0046994 A1 * | 3/2007 | Morales et al. | 358/1.16 |
| 2007/0139702 A1 * | 6/2007 | Sato et al. | 358/1.15 |
| 2007/0263245 A1 * | 11/2007 | Carney et al. | 358/1.15 |
| 2007/0273922 A1 * | 11/2007 | Matsugashita | 358/1.15 |
| 2008/0218788 A1 * | 9/2008 | Mimura | 358/1.15 |
| 2008/0218796 A1 * | 9/2008 | Wanda | 358/1.15 |
| 2009/0091783 A1 * | 4/2009 | Kazume et al. | 358/1.15 |
| 2009/0225354 A1 * | 9/2009 | Yonezawa | 358/1.15 |
| 2009/0303534 A1 * | 12/2009 | Gotoh et al. | 358/1.15 |

FOREIGN PATENT DOCUMENTS

| | | |
|---|---|---|
| JP | 2002-189581 | 7/2002 |
| JP | 2003-271347 | 9/2003 |
| JP | 3958016 | 5/2007 |
| JP | 2007-272832 | 10/2007 |
| JP | 2007-272833 | 10/2007 |

* cited by examiner

*Primary Examiner* — Kimberly A Williams
(74) *Attorney, Agent, or Firm* — Oblon, Spivak, McClelland, Maier & Neustadt, L.L.P.

(57) ABSTRACT

When a printing device is in a state in which a printing process of a print job including at least one print data and a series of process commands from a host apparatus cannot be executed, a printing processing unit transfers a printing right corresponding to the print job that is left unprinted to other printing device. When the printing device is in a state in which the printing process can be executed and if the printing right corresponding to the print job that is left unprinted is transferred to the printing device from the other printing device, the printing processing unit executes the printing process.

17 Claims, 18 Drawing Sheets

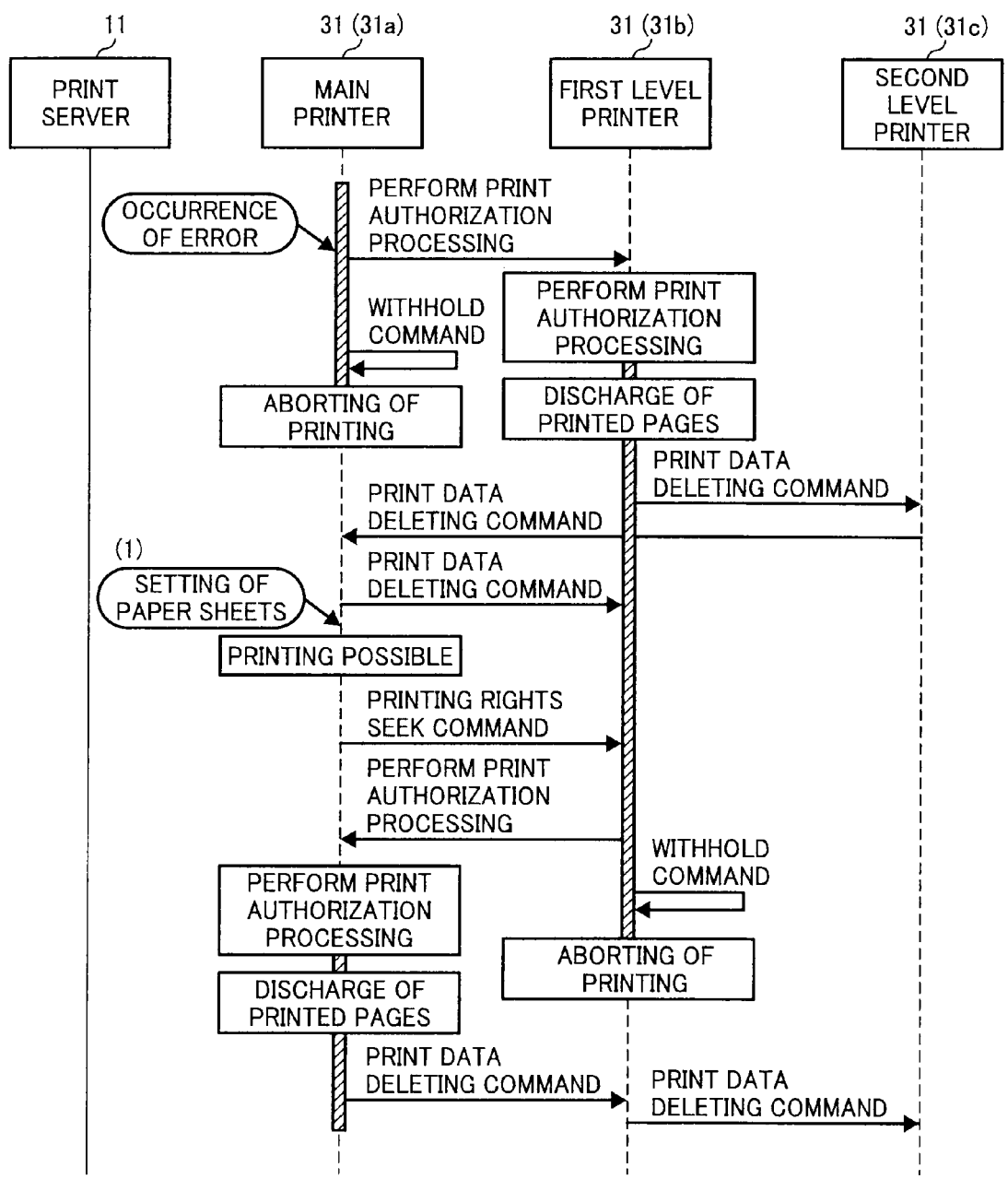

PRINTING DEVICE, PRINTING SYSTEM, AND COMPUTER PROGRAM PRODUCT

CROSS-REFERENCE TO RELATED APPLICATIONS

The present application claims priority to and incorporates by reference the entire contents of Japanese priority document 2008-154190 filed in Japan on Jun. 12, 2008.

BACKGROUND OF THE INVENTION

1. Field of the Invention

The present invention relates to a network printing technology.

2. Description of the Related Art

In recent years, a network printing technology is being actively developed. For example, Japanese Patent Application Laid-open No. 2003-271347 discloses a network printing system in which printing is performed at a printer connected to a network such as Internet.

FIG. 15 is a schematic diagram for explaining a conventional network printing system. The network printing system in FIG. 15 is configured as an extranet environment in which an intranet environment 200 is connected to another intranet environment 300 via a network 400. In such a configuration, it is possible to carry out a print job at a printer arranged in the intranet environment 300 by giving a printing instruction from a host computer arranged in the intranet environment 200, and vice versa.

However, during a printing process in a conventional network printing system, there is a possibility that an error such as a paper-out condition, a paper jam condition, or a toner empty condition occurs in the printer thereby causing interruption in the printing process. If the host computer is not notified about such an error, then there is a possibility that the printer is left unattended without being restored to a printable state.

SUMMARY OF THE INVENTION

It is an object of the present invention to at least partially solve the problems in the conventional technology.

According to one aspect of the present invention, there is provided a printing device that is configured to connect to a host apparatus and other printing device via a network and executes a printing process of a print job including at least one print data and a series of process commands from the host apparatus. The printing device includes a session setup unit that sets up a session with the host device and the other printing device; a printing processing unit that executes the printing process, provided that the printing device has a printing right for the print job; and a job synchronizing unit that maintains, upon executing the printing process, a synchronization of the print job with the other printing device that is in session with the printing device. When the printing device is in a state in which the printing process cannot be executed, the printing processing unit transfers the printing right corresponding to the print job that is left unprinted to the other printing device, and when the printing device is in a state in which the printing process can be executed and if the printing right corresponding to the print job that is left unprinted is transferred to the printing device from the other printing device, the printing processing unit executes the printing process.

Furthermore, according to another aspect of the present invention, there is provided a printing system that includes at least two printing devices including a first printing device and a second printing device being connected via a network and executing a printing process of a print job including at least one print data and a series of process commands from a host apparatus. The printing system further includes a session setup unit that sets up a session between the host apparatus and the printing devices connected to the host apparatus; a printing processing unit that executes the printing process on the first printing device, provided that the first printing device has a printing right for the print job; and a job synchronizing unit that maintains, upon executing the printing process on the first printing device, a synchronization of the print job with the second printing device that is in session with the first printing device. When the first printing device is in a state in which the printing process cannot be executed, the printing processing unit transfers the printing right corresponding to the print job that is left unprinted to the second printing device, and when the first printing device is in a state in which the printing process can be executed and if the printing right corresponding to the print job that is left unprinted is transferred to the first printing device from the second printing device, the printing processing unit executes the printing process on the first printing device.

Moreover, according to still another aspect of the present invention, there is provided a computer program product including a computer-usable medium having computer-readable program codes embodied in the medium for controlling a printing device that is connect to a host apparatus and other printing device via a network and executes a printing process of a print job including at least one print data and a series of process commands from the host apparatus. The program codes when executed cause a computer to execute setting up a session with the host device and the other printing device; executing the printing process, provided that the printing device has a printing right for the print job; and maintaining, upon executing the printing process, a synchronization of the print job with the other printing device that is in session with the printing device. When the printing device is in a state in which the printing process cannot be executed, the executing includes transferring the printing right corresponding to the print job that is left unprinted to the other printing device, and when the printing device is in a state in which the printing process can be executed and if the printing right corresponding to the print job that is left unprinted is transferred to the printing device from the other printing device, the executing includes executing the printing process.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a sequence diagram for explaining an exemplary sequence of operations according to a second embodiment of the present invention in transferring printing rights in case of an error;

DETAILED DESCRIPTION OF THE PREFERRED EMBODIMENTS

Exemplary embodiments of the present invention are described in detail below with reference to the accompanying drawings. The present invention is not limited to these exemplary embodiments.

A laser printer or a multifunction peripheral (MFP) is used as a printing device in the following embodiments.

Figure 1:
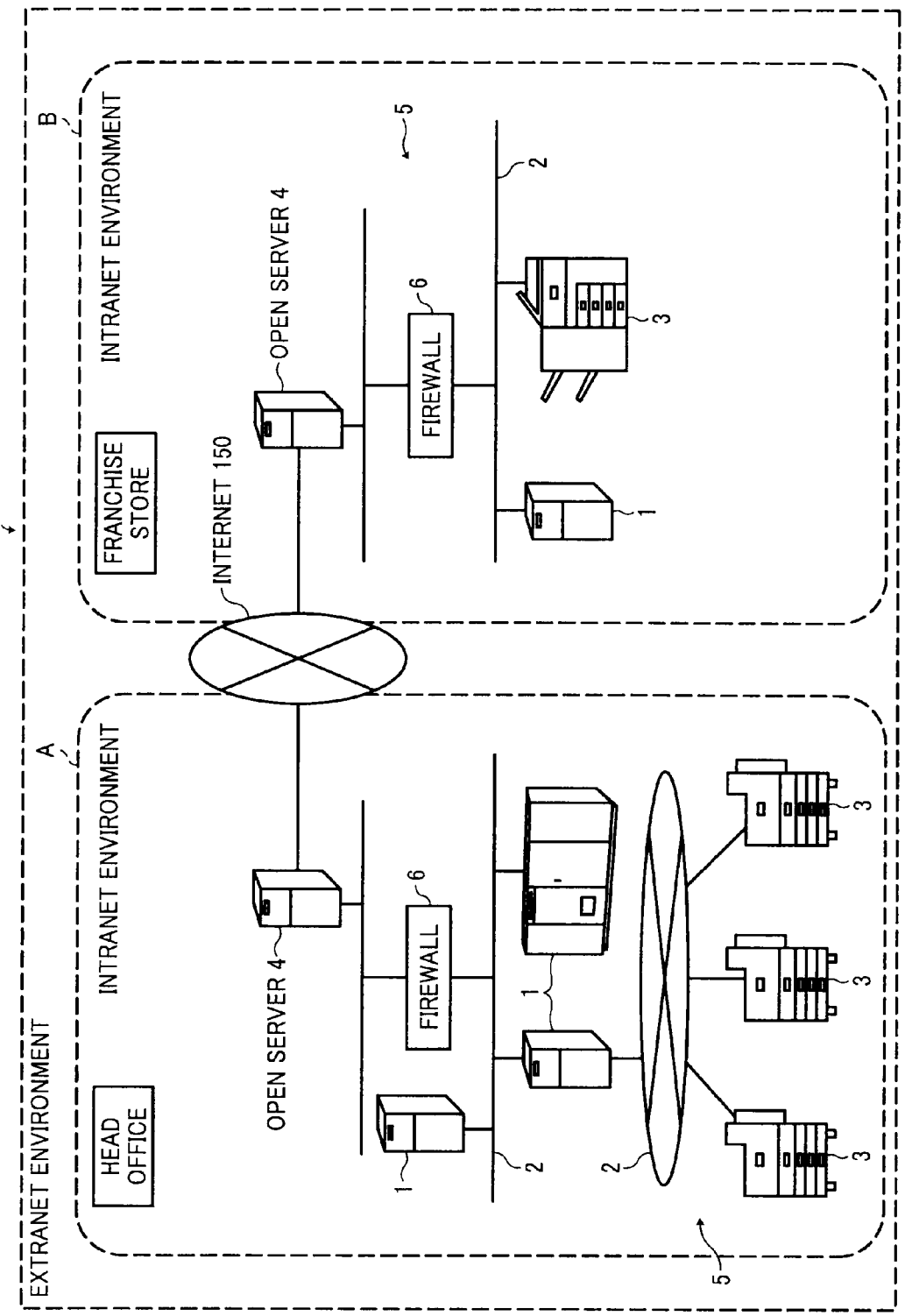
FIG. 1 is a schematic diagram of a network printing system according to a first embodiment of the present invention.

FIG. 1 is a schematic diagram of a network printing system 100 according to a first embodiment of the present invention. The network printing system 100 is configured as an extranet environment in which an intranet environment A is connected to an intranet environment B via an external network 150 such as Internet. Each of the intranet environments A and B is assumed to be, although not limited to, an in-house network environment of a business establishment configured based on Internet technology. For example, the intranet environment A is assumed to be the in-house network environment of a head office of a convenience store chain, while the intranet environment B is assumed to be the in-house network environment of a franchise store of the convenience store chain. The intranet environment A includes an internal network system 5 that is connected to an open server 4 such as a World Wide Web (WWW) server via a firewall 6. The internal network system 5 is built on a client-server architecture in which a plurality of server computers 1 (hereinafter, "servers 1") and a plurality of client devices 3 are interconnected via a local network 2 such as a local area network (LAN). In the example shown in FIG. 1, the client devices 3 are assumed to be, although not limited to, printers. The firewall 6 monitors data packets that are communicated between the internal network system 5 and the external network 150 via the open server 4. From the security perspective of the internal network system 5, the firewall 6 determines whether to allow or to block the communication of each data packet based on predetermined conditions.

The intranet environment B has an identical configuration to the configuration of the intranet environment A, except that the number of servers 1 or the number of client devices 3 is not necessarily same.

Meanwhile, instead of using the external network 150, a dedicated communication line can be used to connect the intranet environment A to the intranet environment B.

Moreover, the local network 2 can be configured to be compatible to any one of wire communication, wireless infrared communication, wireless radio communication, optical fiber communication, and the like.

Figure 2:
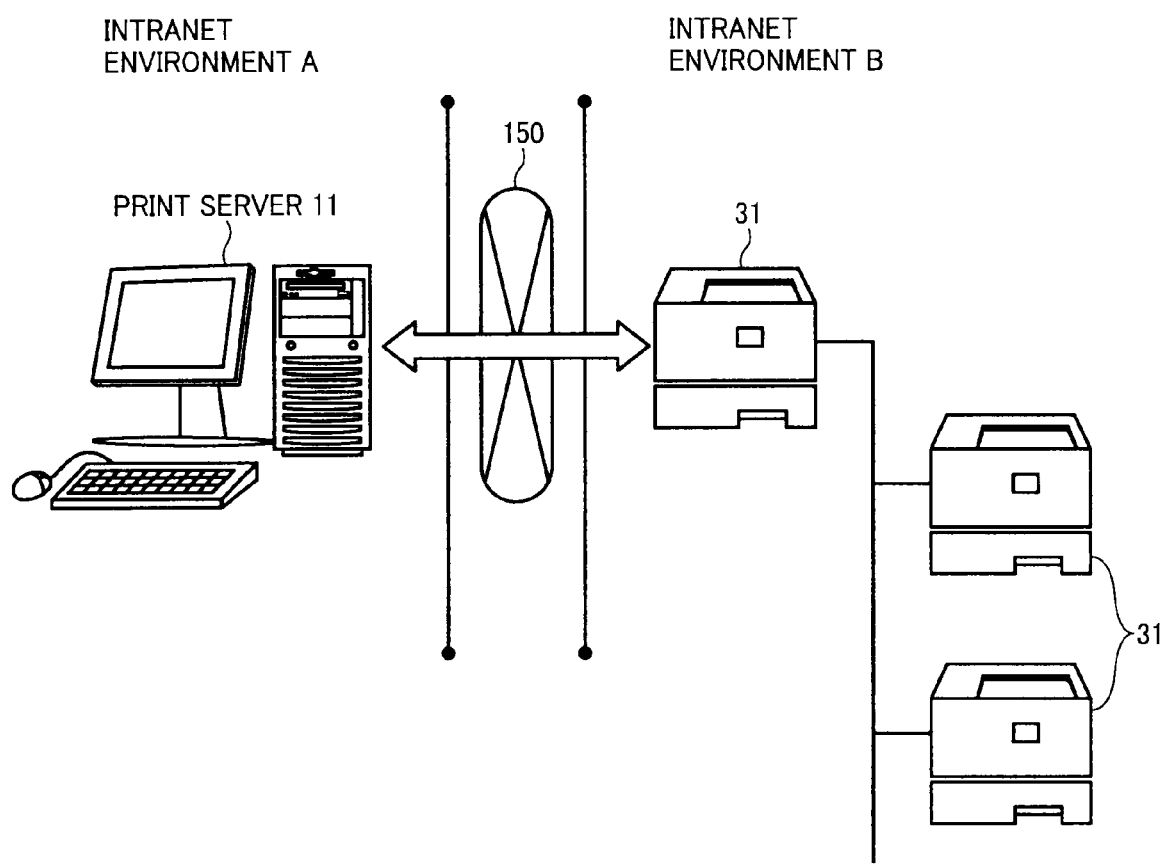
FIG. 2 is a schematic diagram for explaining an exemplary configuration of the network printing system.

In the network printing system 100, it is possible to carry out print jobs at a printer arranged in the intranet environment B by giving a printing instruction by using a server arranged in the intranet environment A, and vice versa. For example, as shown in FIG. 2, a printing instruction can be sent to a uniquely-determined printer 31, which is one of a plurality of printers 31 arranged in the intranet environment B, from a print server 11, which is one of the servers 1 arranged in the intranet environment A. In the example shown in FIG. 2, the uniquely-determined printer 31 is considered to be the highest level printer in the intranet environment B and hereinafter referred to as the main printer 31. Moreover, two lower level printers 31 (first level printer 31 and second level printer) are arranged with respect to the main printer 31 by using, although not limited to, a ring topology.

Figure 3:
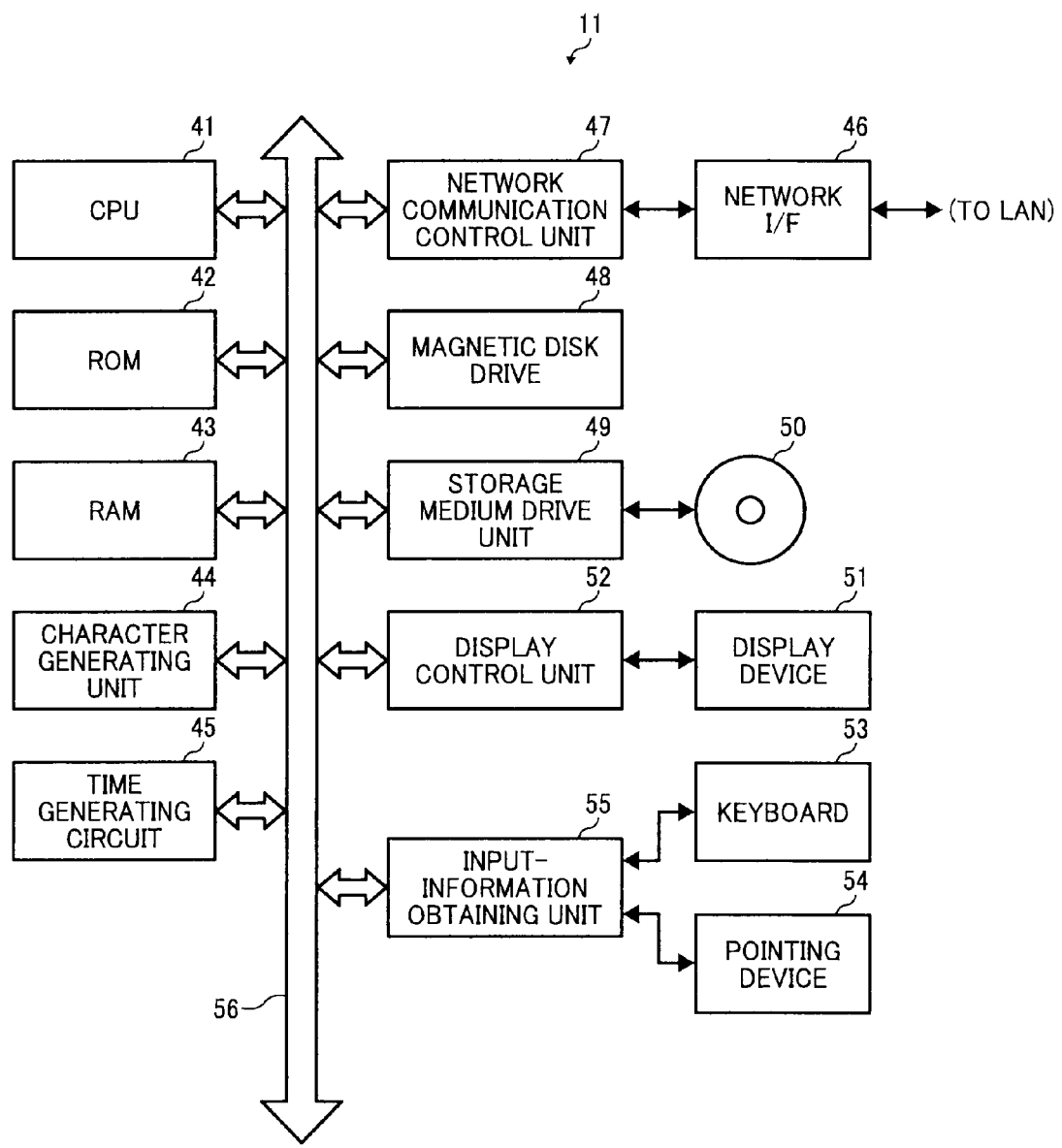
FIG. 3 is a block diagram for explaining an exemplary hardware configuration of a print server in the network printing system.

FIG. 3 is a block diagram for explaining an exemplary hardware configuration of the print server 11. The print server 11 includes a central processing unit (CPU) 41, a read only memory (ROM) 42, a random access memory (RAM) 43, a character generating unit 44, a time generating circuit 45, a network communication control unit 47, a magnetic disk drive 48, a storage medium drive unit 49, a display control unit 52, and an input-information obtaining unit 55. An internal bus 56 is used to interconnect the abovementioned hardware components. Moreover, a network interface (I/F) 46 is arranged to interface the print server 11 to the local network 2. The CPU 41 controls the operations of the print server 11. The ROM 42 is used to store application programs and data necessary for booting the print server 11. The RAM 43 functions as a work area for the CPU 41. The character generating unit 44 generates graphic characters or display data. The time generating circuit 45 generates current time and date.

The network communication control unit 47 performs communication control processing of predetermined protocol suites. As a result, a variety of data can be communicated between the print server 11 and the servers 1 or the client devices 3 in any one of the intranet environments A and B. For example, the print server 11 can send print data to the main printer 31 or receive the status of ongoing print jobs from the main printer 31.

The magnetic disk drive 48 is used to store a variety of application programs that run on an operating system (OS) of the print server 11 and a variety of data such as work data, file data, and image data. One of the application programs stored in the magnetic disk drive 48 is a print data transmission program that is executed to send print data to a printer. The storage medium drive unit 49 reads a compatible removable storage medium 50 and obtains a variety of application programs or data stored therein.

When the print server 11 is turned ON, the CPU 41 executes a loader routine stored in the ROM 42 and loads the OS from the magnetic disk drive 48 into the RAM 43. The OS manages the hardware components and the application programs in the print server 11. Subsequently, according to user instructions, various functions such as executing application programs, reading information, and storing information are performed. An application program can be a computer program that runs in the OS, or that performs partial execution of any of the processing functions described below, or that is included in a set of program files configuring an application software or the OS. Meanwhile, the removable storage medium 50 can be a compact disk read only memory (CD-ROM), a flexible disk (FD), a CD recordable (CD-R), a CD rewritable (CD-RW), a digital versatile disk (DVD), a semiconductor storage medium, and the like.

Generally, an application program is installed in the magnetic disk drive 48 from the removable storage medium 50. However, it is also possible to directly execute an application program from the removable storage medium 50. Moreover, it is also possible to download an application program via the network I/F 46 and install it in the magnetic disk drive 48.

The display control unit 52 controls the contents of an operation screen that is displayed on a display device 51 such as a cathode ray tube.

The input-information obtaining unit 55 obtains user instructions and information input from a keyboard 53 or a pointing device 54 such as a mouse.

In the print server 11, a specific application program is executed to generate printing document information. Meanwhile, the printing document information can also be obtained by using the removable storage medium 50 or obtained through the external network 150 in the form of an attachment to an electronic mail. The printing document information is stored in the magnetic disk drive 48.

Figure 4:
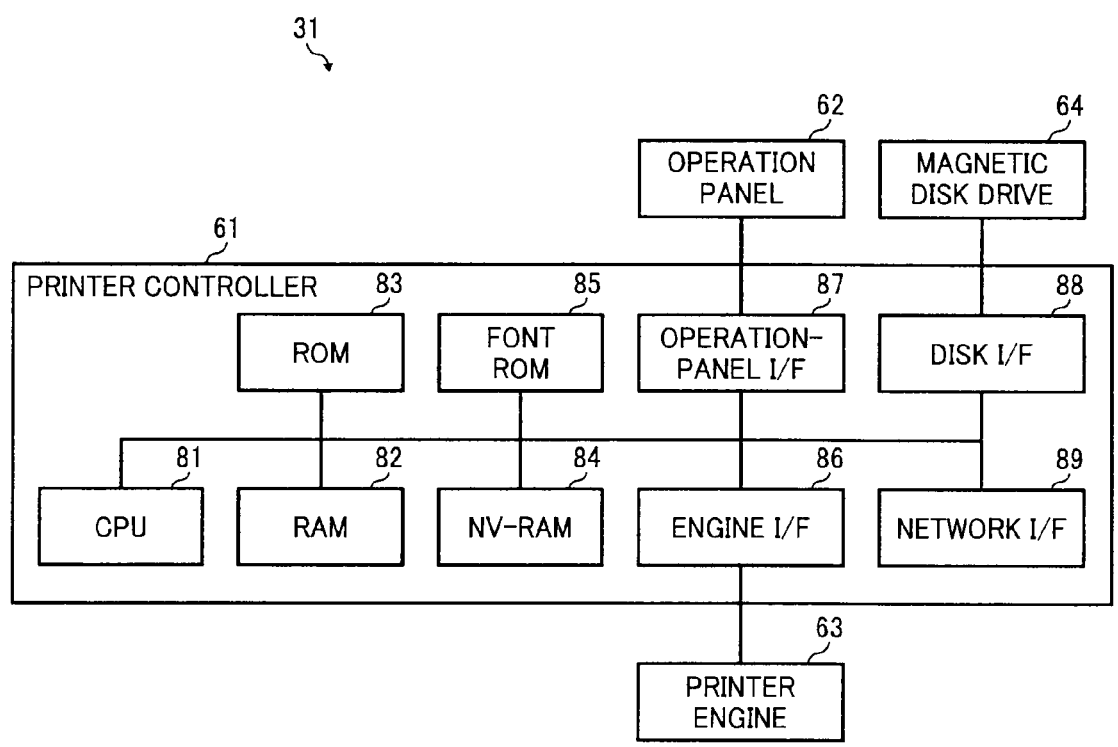
FIG. 4 is a block diagram for explaining an exemplary hardware configuration of a printer in the network printing system.

FIG. 4 is a block diagram for explaining an exemplary hardware configuration of each of the printers 31. Each of the printers 31 includes a printer controller 61, an operation panel 62, a printer engine 63, and a magnetic disk drive 64. The printer controller 61 functions as a motherboard for managing the hardware components and the printing operations of the corresponding printer 31.

More particularly, based on the current print mode and a printer control code, which is included in an instruction received from a print server (e.g., the print server 11), the printer controller 61 converts print data into image data and outputs the image data to the printer engine 63. The printer controller 61 has a modular configuration that includes a CPU 81, a RAM 82, a ROM 83, a non volatile RAM (NV-RAM) 84, a font ROM 85, an engine I/F 86, an operation-panel I/F 87, a disk I/F 88, and a network I/F 89. The CPU 81 controls the functioning of the corresponding printer 31. The ROM 83 is used to store printer-specific information. The NV-RAM 84 is used to store information that needs to be retained even when power is turned OFF. The font ROM 85 is used to store a plurality of printing fonts. The engine I/F 86 interfaces the printer controller 61 to the printer engine 63. The operation-panel I/F 87 interfaces the printer controller 61 to the operation panel 62. The disk I/F 88 interfaces the printer controller 61 to the magnetic disk drive 64.

The RAM 82 functions as a work area for the CPU 81, and is provided with a data buffer area for temporarily storing received data and with an image buffer area for temporarily storing images.

The printer controller 61 sends a print control signal to the printer engine 63 via the engine I/F 86 and receives a status signal from the printer engine 63 via the engine I/F 86.

The network I/F 89 interfaces the corresponding printer 31 to the local network 2 such that the printer 31 can communicate print control signals, status signals, print data, and the like with the servers 1 in the intranet environment A or the intranet environment B.

A user can use the operation panel 62 to set various print settings such as status display setting, print mode setting, and printing condition setting.

The printer engine 63 forms an image by an electrophotographic process and prints the image on a recording medium such as a sheet of recording paper. More particularly, based on image data and print control information from the printer controller 61, the printer engine 63 forms an image on a photosensitive member (not shown) in an electrostatic manner and transfers the image on the recording medium.

The magnetic disk drive 64 is used to store printing document information, various information files, the OS, and a plurality of application programs executed in the OS. One of the application programs stored in the magnetic disk drive 64 is a print job program that is executed to carry out a print job.

When the printer 31 is turned ON, the CPU 81 loads the OS from the magnetic disk drive 64 into the RAM 82. The OS manages the hardware components and the application programs in the printer 31. Subsequently, according to user instructions, various functions such as executing application programs, reading information, and storing information are performed. An application program can be a computer program that runs in the OS, or that performs partial execution of any of the print processing functions described below, or that is included in a set of program files configuring an application software or the OS.

Generally, an application program is installed in the magnetic disk drive 64 from a removable storage medium (not shown). However, an application program can be directly executed from the removable storage medium. Moreover, it is also possible to download an application program via the network I/F 89 and install it in the magnetic disk drive 64.

Meanwhile, instead of the magnetic disk drive 64, it is also possible to use a computer-readable storage medium such as a semiconductor memory for storing various application programs and the OS.

Given below is the description of a substitutive printing process in which one or more lower level printers are kept ready to substitutively perform printing of print data in case a problem occurs in a higher level printer while printing that print data.

In the example shown in FIG. 2, when the main printer 31 receives print data from the print server 11, the printer controller 61 of the main printer 31 converts the print data into image data based on the print control information and outputs the image data to the printer engine 63. A print command is issued to the printer engine 63 to start printing the image data. However, during the printing process, there is a possibility that an error such as a paper-out condition, a paper jam condition, or a toner empty condition occurs in the main printer 31 thereby causing interruption in the printing process. Usually, when an error occurs, the printing process is interrupted and it resumes only after a user manually solves the problem. However, in the network printing system 100, the printing process can be prevented from interruption by instructing one of the other printers 31 in the intranet environment B (hereinafter, "lower level printers 31") to continue printing of the print data in place of the main printer 31.

As described above, one of the application programs stored in the magnetic disk drive 48 is the print data transmission program. When the print data transmission program is executed in the OS of the print server 11, the CPU 41 accordingly transmits the print data to the main printer 31.

As described above, one of the application programs stored in the magnetic disk drive 48 is the print data transmission program. When the print data transmission program is executed in the OS of the print server 11, the CPU 41 accordingly transmits the print data to the main printer 31.

Figure 5:
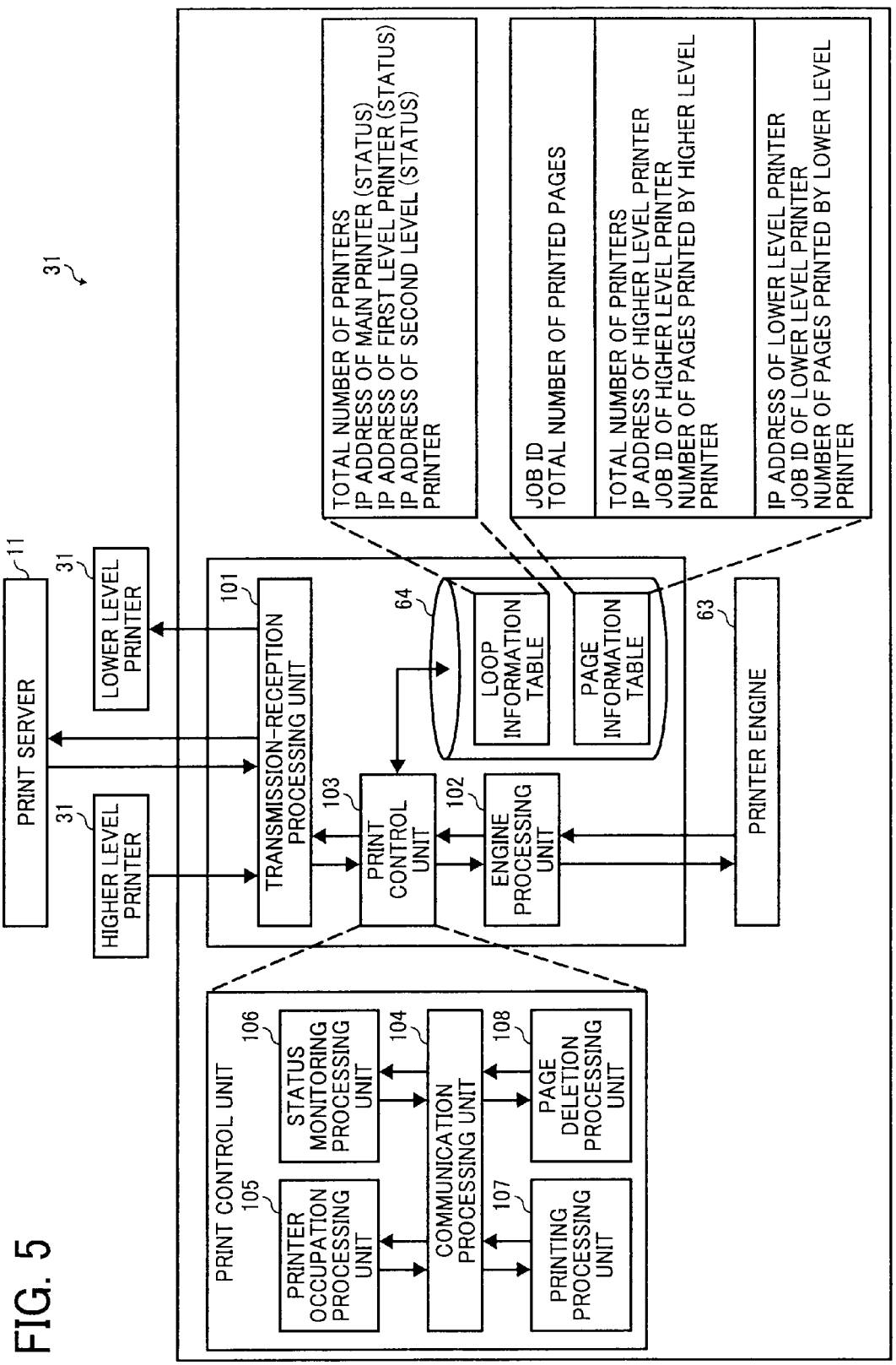
FIG. 5 is a block diagram for explaining a functional configuration of the printer implemented during a substitutive printing process.

FIG. 5 is a block diagram for explaining a functional configuration of an arbitrary one of the printers 31 implemented during the substitutive printing process. As shown in FIG. 5, the printer 31 includes a transmission-reception processing unit 101, an engine processing unit 102, and a print control unit 103. The transmission-reception processing unit 101 performs transmission and reception of a variety of requests (commands) with respect to the print server 11 and the remaining printers 31. The engine processing unit 102 receives printing events and status change events from the printer engine 63 and issues printing instructions to the printer engine 63. The print control unit 103 performs print control processing based on the information obtained by the transmission-reception processing unit 101 and the engine processing unit 102.

The transmission-reception processing unit 101 functions as a session setup unit and sets up a session with the print server 11 or with another printer 31 that is connected to the printer 31 under question (hereinafter, "self printer").

The print control unit 103 includes a communication processing unit 104, a printer occupation processing unit 105, a status monitoring processing unit 106, a printing processing unit 107, and a page deletion processing unit 108.

The communication processing unit 104 receives information from the transmission-reception processing unit 101 and the engine processing unit 102 and sends commands issued from the print control unit 103.

The printer occupation processing unit 105 obtains printer information (e.g., IP addresses) of each of the connected printers 31, integrates all the printer information, and stores the integrated printer information in, e.g., a loop information table created in the magnetic disk drive 64.

The status monitoring processing unit 106 holds up-to-date status information of the self printer 31 based on status information sent by the engine processing unit 102. The up-to-date status information is used to determine whether the self printer 31 is in a printable state in response to an external printing request.

The printing processing unit 107, on the one hand, performs withhold processing in which the self printer 31 withholds carrying out of an initiated print job and authorizes another printer 31 to carry out the initiated print job (transfer of printing rights). On the other hand, the printing processing unit 107 performs print authorization processing in which the self printer 31 authorizes itself to carry out a print job upon receiving printing rights from another printer 31.

The page deletion processing unit 108 functions as a job synchronizing unit and maintains synchronization between the print data (print job) stored in the self printer 31 and the print data (print jobs) stored in the remaining printers 31. The details regarding the print data are stored in, e.g., a page information table created in the magnetic disk drive 64.

A main process in the substitutive printing process performed by the print control unit 103 is described below. The main process is described in details for each scene.

Figure 6:
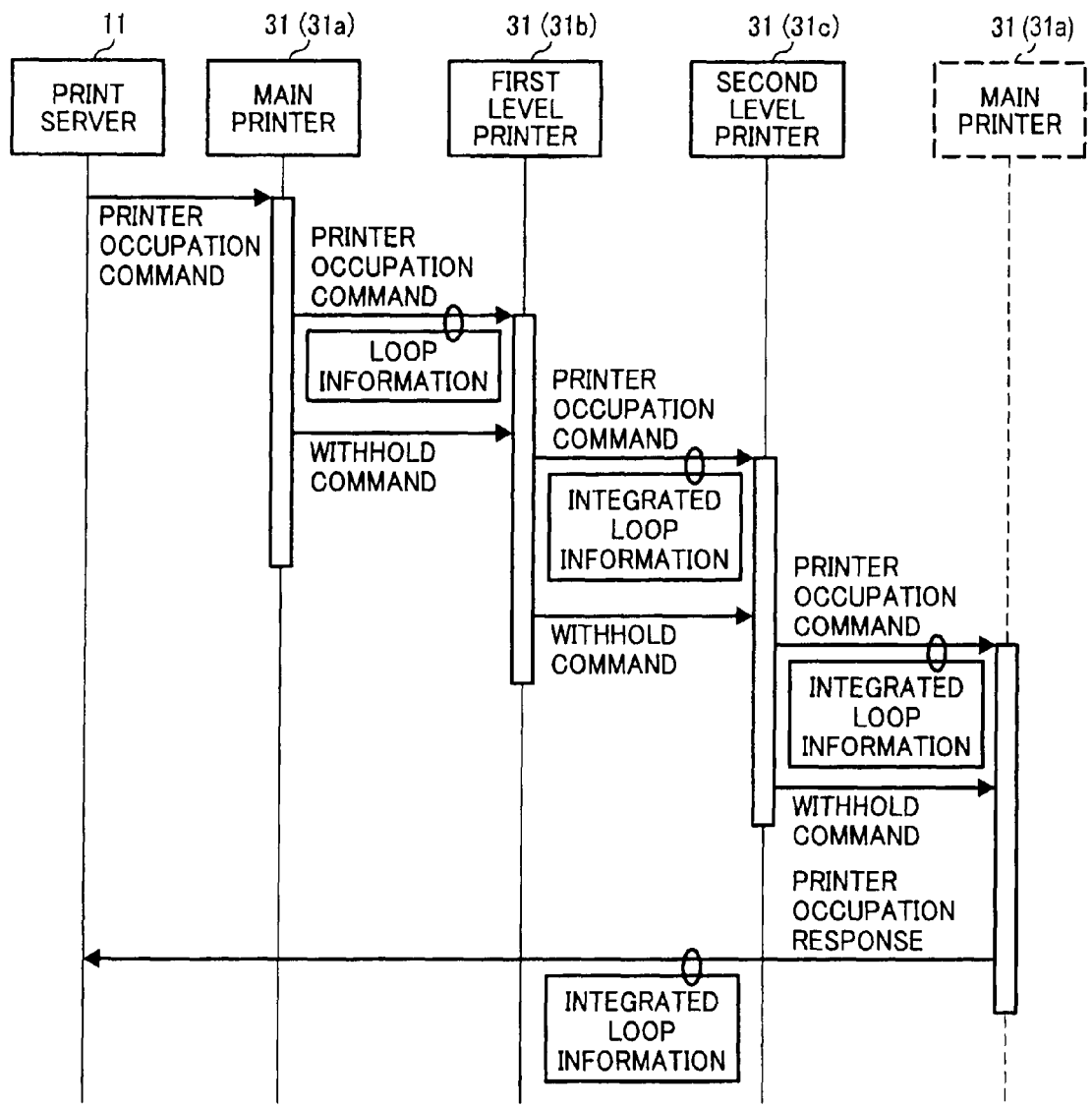
FIG. 6 is a sequence diagram of a printer occupation process in the substitutive printing process.
Figure 7:
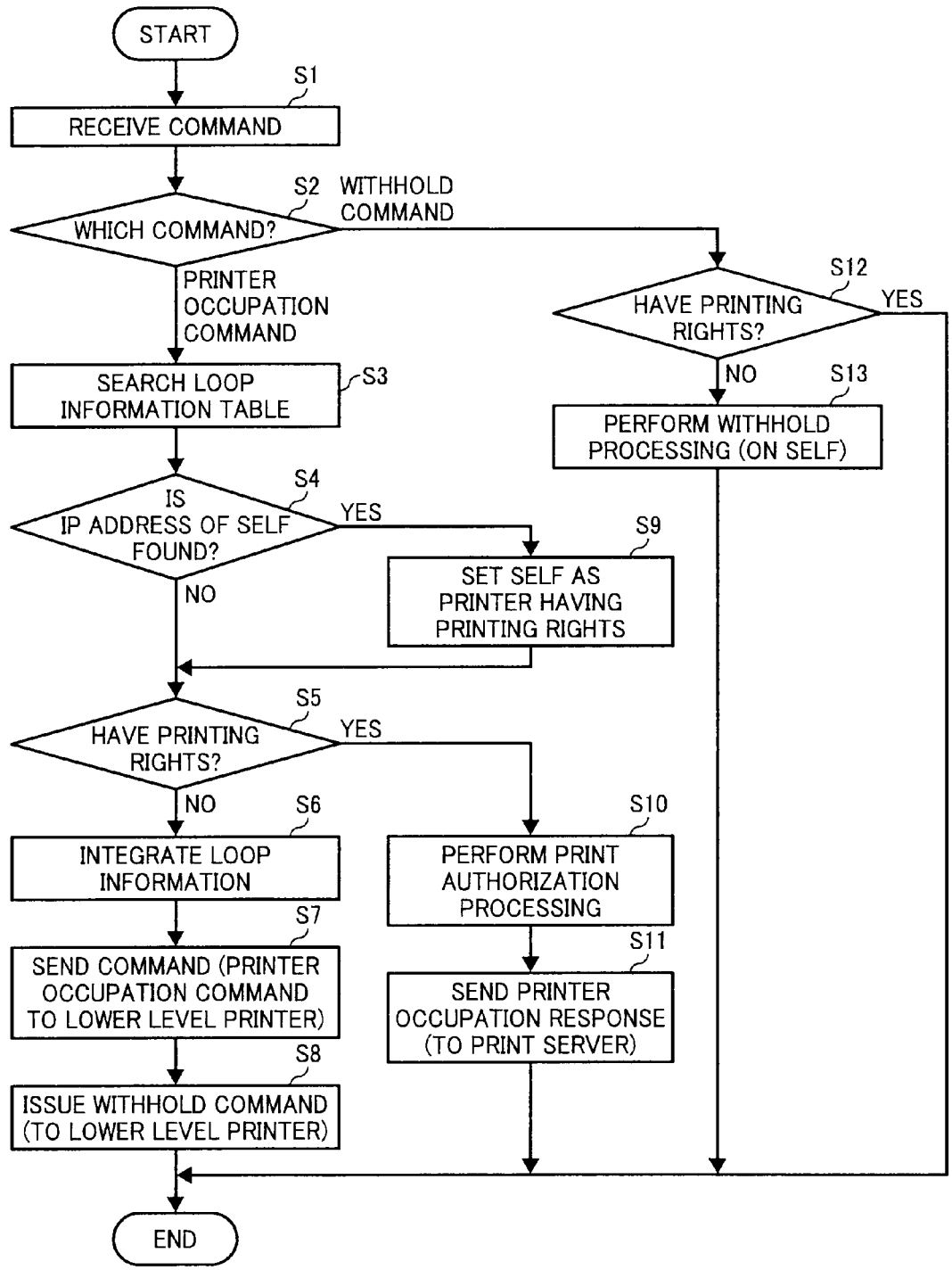
FIG. 7 is a flowchart for explaining a sequence of operations in the printer occupation process.

FIG. 6 is a sequence diagram of a printer occupation process in the substitutive printing process. FIG. 7 is a flowchart for explaining a sequence of operations in the printer occupation process. In the example shown in FIG. 6, the intranet environment B includes a main printer 31a, a first level printer 31b, and a second level printer 31c connected via a network.

The main printer 31a, the first level printer 31b, and the second level printer 31c all have the identical configuration as the printer 31 illustrated in FIGS. 4 and 5. As described above, a main printer is uniquely determined by the print server 11. Thus, the main printer functions as the highest level printer and receives print data directly from the print server 11. All or some of the other printers that are connected to the main printer function as lower level printers (or sub-printers). Meanwhile, the levels of the lower level printers can be maintained in a fixed order or can be varied for each print job. For example, it is possible to store in each printer the internet protocol (IP) address of an immediate lower level printer to which print data or various commands are to be forwarded. In the example shown in FIG. 6, the second level printer 31c is configured as the immediate lower level printer with respect to the first level printer 31b, while the first level printer 31b is configured as the immediate lower level printer with respect to the main printer 31a.

In the substitutive printing process, the printer occupation process is performed after the self printer 31 sets up a session (i.e., establishes a link) with the print server 11 and with another connected printer 31.

When the self printer 31 receives a printer occupation command sent by the print server 11 (Step S1, "printer occupation command" at Step S2 in FIG. 7), the self printer 31 searches, as a dedicated printer for carrying out print jobs instructed only by the print server 11, the loop information table (Step S3). In the printer occupation process, the self printer 31 that has received a printer occupation command from either one of the print server 11 or the corresponding immediate higher level printer 31 determines whether it has the printing rights (i.e., whether it is authorized to carry out a print job). That is determined based on whether the IP address of the self printer 31 is found in the loop information table. When the self printer 31 receives a printer occupation command for the first time, the IP address thereof is not found in the loop information table (No at Step S4) and the self printer 31 does not have the printing rights (No at Step S5). In that case, the self printer 31 stores its own IP address in the loop information table (Step S6).

Moreover, in the case of the lower level printer 31 (e.g., the first level printer 31b or the second level printer 31c shown in FIG. 6) with respect to which the higher level printer 31 is arranged, the IP address of the lower level printer 31 is integrated into the loop information table at Step S6.

The self printer 31 then forwards the printer occupation command to the corresponding immediate lower level printer 31 (Step S7). In the example shown in FIG. 6, the main printer 31a forwards the printer occupation command to the first level printer 31b. As a result, the first level printer 31b also functions as a dedicated printer to carry out print jobs instructed by the print server 11. In addition to the printer occupation command, the self printer 31 issues a withhold command to the corresponding immediate lower level printer 31 (Step S8). The withhold command instructs the immediate lower level printer 31 to withhold printing.

In an identical manner, the printer occupation command is sequentially forwarded to the lowest level printer 31 with respect to which no immediate lower level printer 31 is arranged (e.g., the second level printer 31c in FIG. 6). As a result, the lowest level printer 31 also functions as a dedicated printer to carry out print jobs instructed by the print server 11. At that stage, the IP addresses of all the printers 31 in session are stored in the loop stage information.

Meanwhile, when the self printer 31 receives a withhold command (Step S1, "withhold command" at Step S2), the self printer 31 determines whether it has the printing rights (Step S12). If the self printer 31 is not determined to have the printing rights (No at Step S12), then the self printer 31 withholds printing (Step S13).

Because of the ring topology implemented in connecting the printers 31, the lowest level printer 31 (e.g., the second level printer 31c in FIG. 6) sends back the printer occupation command and the withhold command to the highest level printer 31 (e.g., the main printer 31a in FIG. 6).

Upon receiving the printer occupation command (Step S1, "printer occupation command" at Step S2), the highest level printer 31 (e.g., the main printer 31a in FIG. 6) searches for its own IP address in the loop information table (Step S3). Because the IP address of the highest level printer 31 is present in the loop information table (Yes at Step S3), the highest level printer 31 sets itself as the printer having printing rights (Step S9). Because of the printing rights (Yes at Step S5), the highest level printer 31 performs print authorization processing (Step S10) and sends a response corresponding to the printer occupation command (hereinafter, "printer occupation response") to the print server 11. The printer occupation response includes response information (e.g., IP address) of all the dedicated printers 31 that have received the printer occupation command sent by the print server 11 (Step S11).

In this way, the print server 11 receives up-to-date response information from all the dedicated printers 31 and keeps a log of the response information.

Meanwhile, as described above, the main printer 31a communicates information with the print server 11 via the external network 150 and the firewall 6. For that, either the firewall 6 can be configured to allow the communication of information or the information can be communicated in the form of an attachment to an electronic mail.

Meanwhile, when the highest level printer 31 receives the withhold command (Step S1, "withhold command" at Step S2), the highest level printer 31 determines whether it has the printing rights (Step S12). As described above, because the highest level printer 31 is determined to have the printing rights and determined to have performed print authorization processing (Yes at Step S12), the printer occupation process is completed at that stage.

Figure 8:
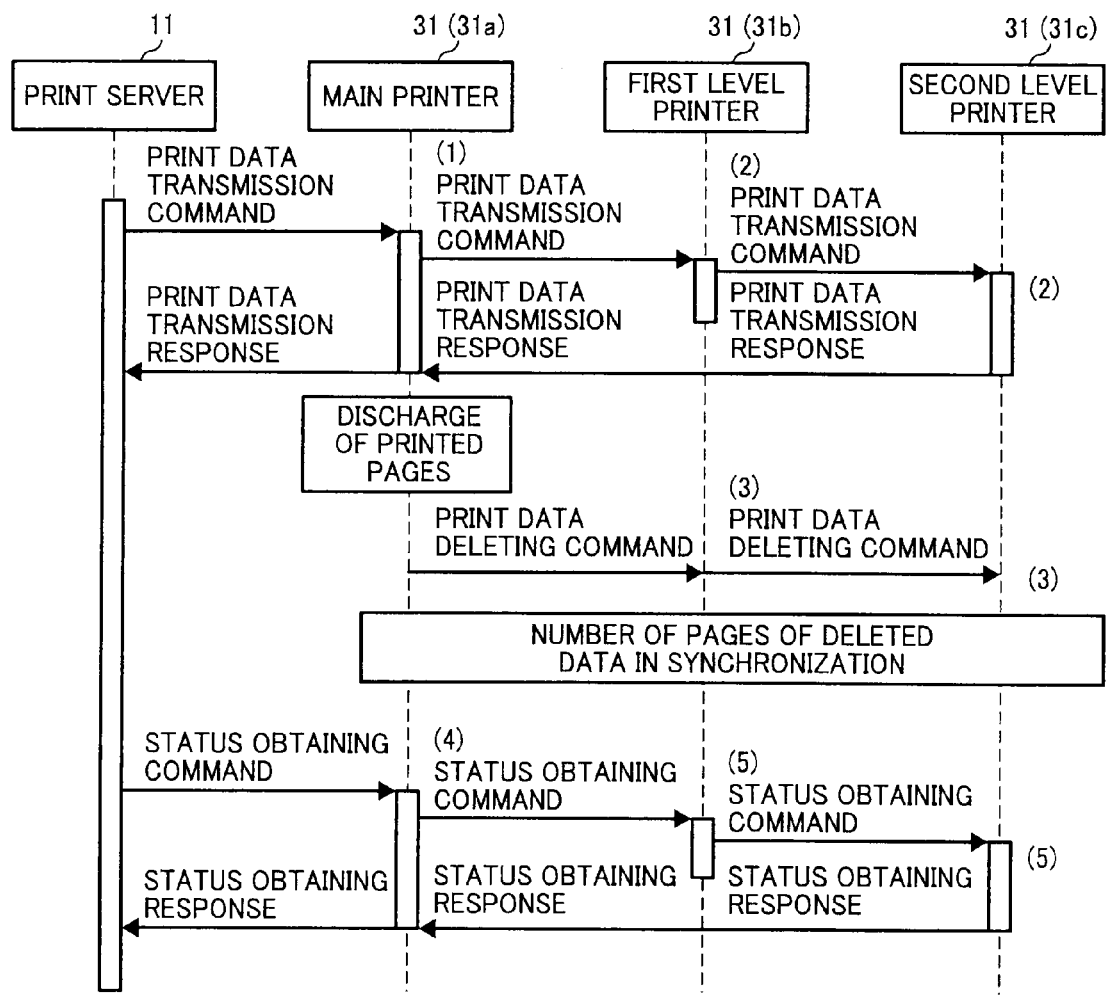
FIG. 8 is a sequence diagram of an exemplary printing process when no error occurs in a main printer.

After the printer occupation process is completed, the printer 31 that has the printing rights performs printing. The printing process when no error occurs is described with reference to FIG. 8 in the following sequence:

(1) The print server 11 issues a print data transmission command to the main printer 31a. The main printer 31a forwards the print data transmission command to the first level printer 31b.

(2) Subsequently, the first level printer 31b forwards the print data transmission command to the second level printer 31c. Because no immediate lower level printer is arranged with respect to the second level printer 31c, it sends back a response corresponding to the data transmission command (hereinafter, "print data transmission response") to the first level printer 31b and performs print data processing of the initiated print job. Eventually, the first level printer 31b sends a print data transmission response to the main printer 31a, which in turn sends a print data transmission response to the print server 11. Then, the main printer 31a performs print data processing of the initiated print job and prints the print data in the initiated print job.

(3) For each printed and discharged page of the print data, the main printer 31a issues a print data deleting command to the first level printer 31b. Consequently, the first level printer 31b deletes the print data corresponding to the discharged page. Subsequently, the first level printer 31b forwards the print data deleting command to the second level printer 31c. Consequently, the second level printer 31c also deletes the print data corresponding to the discharged page of the print data. In this way, the deleted data corresponding to the discharged pages is maintained in synchronization in the main printer 31a, the first level printer 31b, and the second level printer 31c.

(4) The print server 11 issues a status obtaining command to the main printer 31a. The main printer 31a then forwards the status obtaining command to the first level printer 31b.

(5) In turn, the first level printer 31b forwards the status obtaining command to the second level printer 31c. Because no immediate lower level printer is arranged with respect to the second level printer 31c, it sends back a status obtaining response to the first level printer 31b, which in turn sends a status obtaining response to the main printer 31a.

Figure 9:
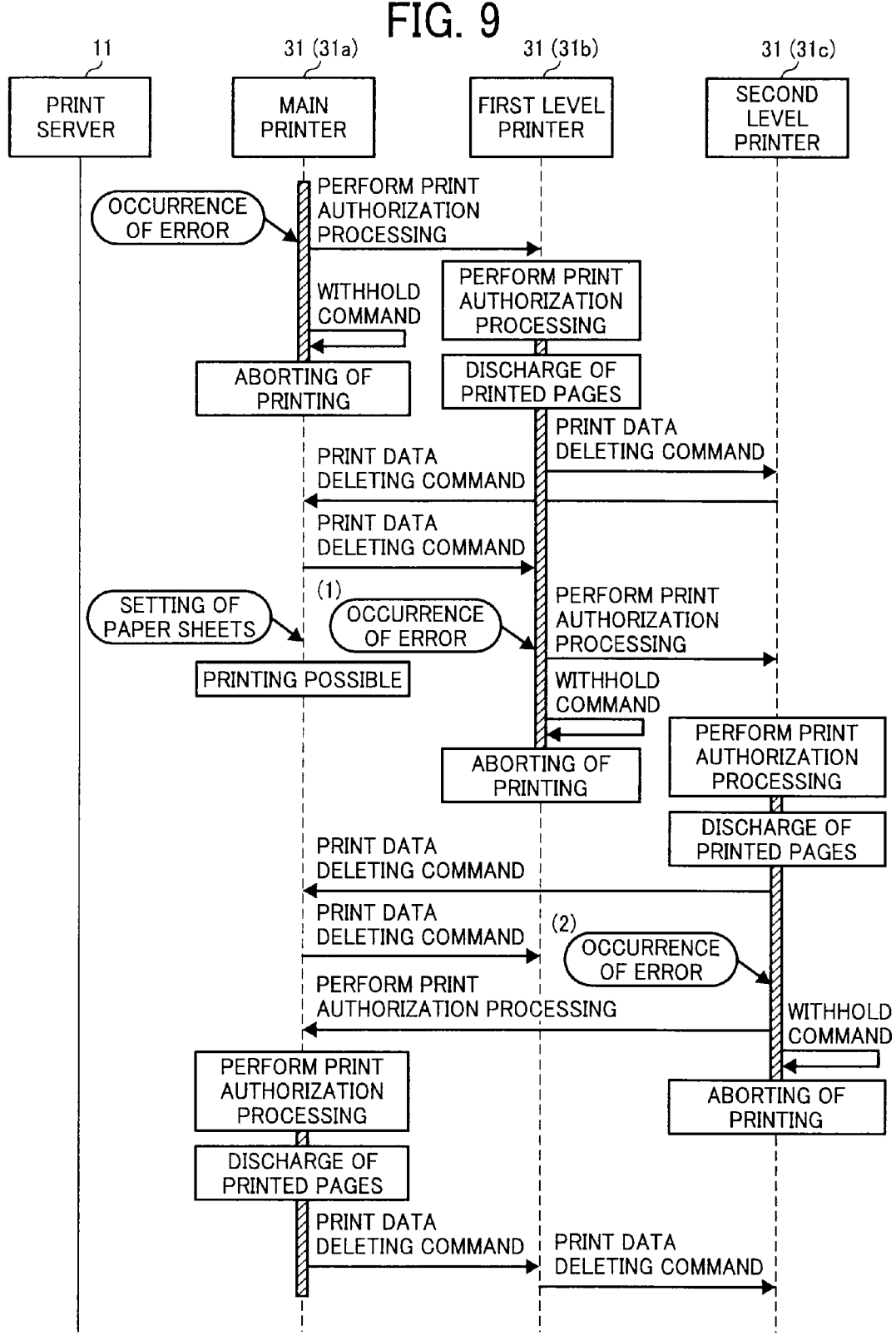
FIG. 9 is a sequence diagram for explaining an exemplary sequence of operations in transferring printing rights in case of an error.
Figure 10A:
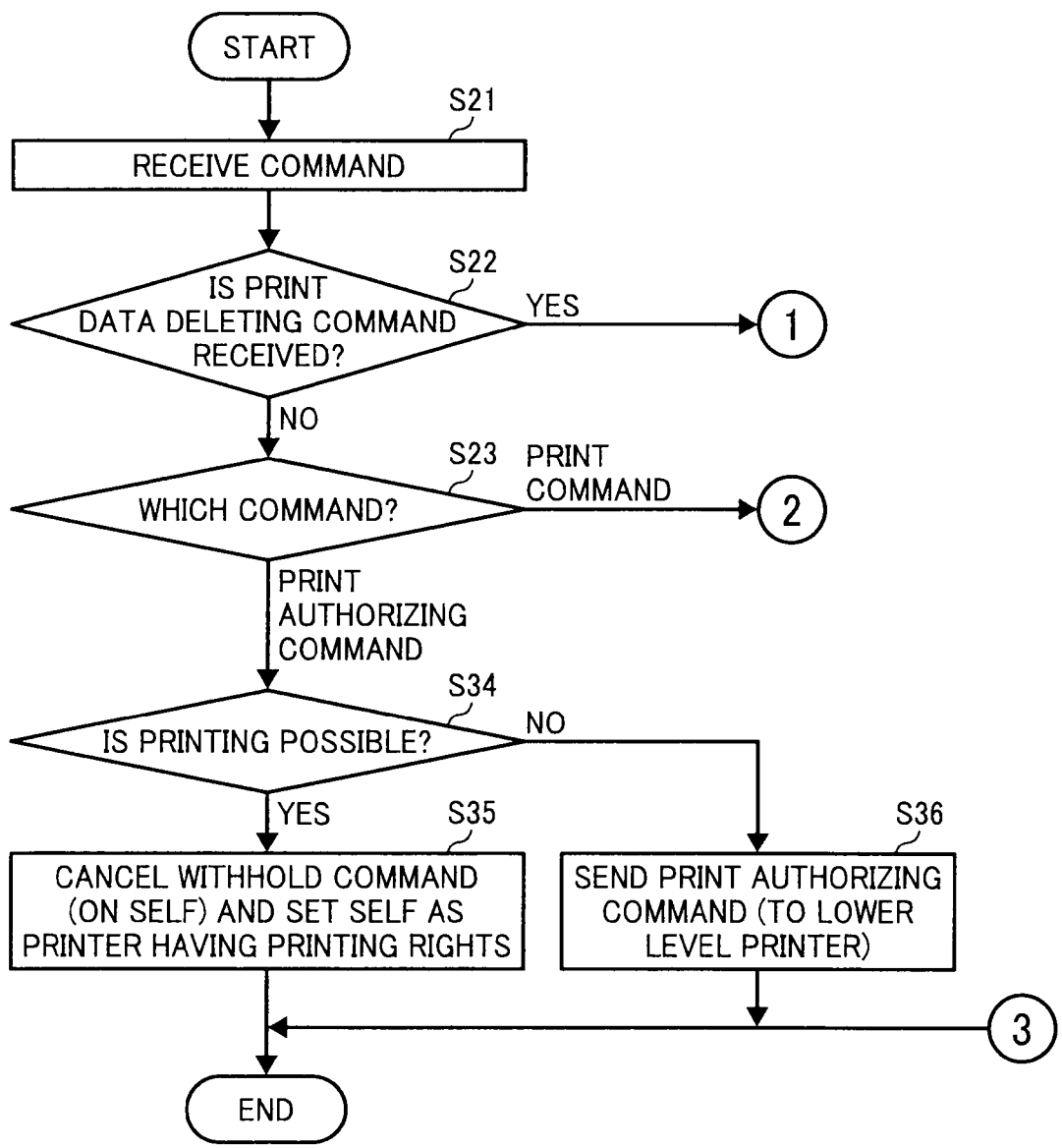
FIGS. 10A and 10B are flowcharts for explaining an exemplary substitutive printing process when an error occurs in more than one printer while printing print data.
Figure 10B:
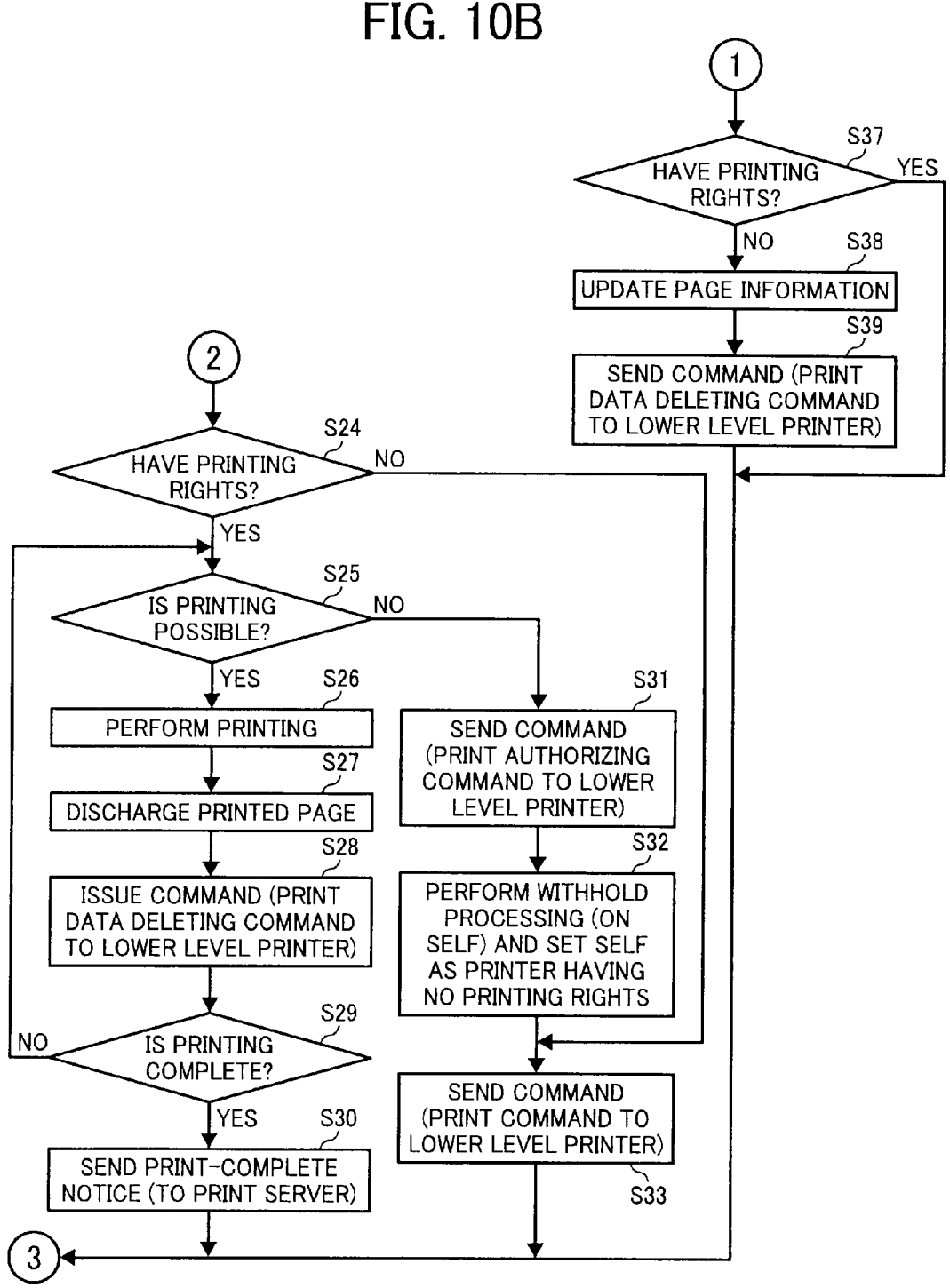

Given below is the description of an exemplary substitutive printing process when an error occurs in more than one printer while printing print data. FIG. 9 is a sequence diagram for explaining an exemplary sequence of operations in transferring printing rights in case of an error. FIGS. 10A and 10B are flowcharts for explaining an exemplary substitutive printing process when an error occurs in more than one printer while printing print data.

When the main printer 31a shown in FIG. 9 receives a print command from the print server 11 (Step S21, No at Step S22, and "print command" at Step S23 in FIG. 10A) and when the main printer 31a is determined to have the printing rights (Yes at Step S24) and determined to be in a printable state (Yes at Step S25), then the main printer 31a performs printing and discharges printed pages (Steps S26 and S27) and issues a print data deleting command to the first level printer 31b for each printed and discharged page of the print data (Step S28).

If the main printer 31a is determined not to have the printing rights (No at Step S24), the main printer 31a forwards the print command to the first level printer 31b (Step S33). In this way, the print command is sequentially forwarded to each printer 31 if the corresponding immediate higher level printer 31 is determined not to have the printing rights.

When the first level printer 31b receives the print data deleting command (Yes at Step S22) and is determined not to have the printing rights (No at Step S37), then the first level printer 31b updates page information by deleting the print data corresponding to each discharged page (Step S38) and forwards the print data deleting command to the second level printer 31c (Step S39). Consequently, the second level printer 31c also deletes the print data corresponding to each discharged page. In this way, the deleted data corresponding to the discharged pages is maintained in synchronization in the main printer 31a, the first level printer 31b, and the second level printer 31c.

The operations from Steps S25 to S29 are repeated until printing is complete (Yes at Step S29).

When printing is complete (Yes at Step S29), the main printer 31a sends a print-completion notice to the print server 11 (Step S30).

Assume that an error (e.g., a paper-out condition or a paper jam condition) that typically requires user intervention for resolution occurs in the main printer 31a while printing the print data.

In other words, assume that the main printer 31a is determined to have the printing rights (Yes at Step S24) but determined to be in a non-printable state (No at Step S25). In that case, the main printer 31a issues a print authorizing command to the first level printer 31b and transfers the printing rights to the first level printer 31b (Step S31). Subsequently, the main printer 31a issues a withhold command to itself, withholds printing thereafter, and sets itself as the printer having no printing rights (Step S32) and forwards the print command to the first level printer 31b (Step S33).

When the first level printer 31b receives the print authorizing command (Step S21, No at Step S22, and "print authorizing command" at Step S23 in FIG. 10A) and when the first level printer 31b is determined to be in a printable state (Yes at Step S34), then the first level printer 31b cancels withhold setting and sets itself as the printer having printing rights (Step S35).

On the other hand, upon receiving the print authorizing command (Step S21, No at Step S22, and "print authorizing command" at Step S23 in FIG. 10A), if the first level printer 31b is determined to be in a non-printable state (No at Step S34), then the first level printer 31b forwards the print authorizing command to the second level printer 31c and transfers the printing rights to the second level printer 31c (Step S36).

Thus, according to the first embodiment, if an error occurs in the main printer 31 while printing the print data, the main printer 31 aborts printing of the print data, withholds printing thereafter, and performs the transfer of printing rights. For that, firstly, the main printer 31 issues a print authorizing command to the immediate lower level printer 31 and, secondly, issues a withhold command to itself and withholds printing thereafter.

Because the deleted data corresponding to the printed and discharged pages is maintained in synchronization in all the printers 31, the immediate lower level printer 31 that receives the printing rights from the main printer 31 can substitutively start printing from the first page of the remaining print data that the main printer 31 could not print because of the error.

If, as shown at (1) in FIG. 9, an error occurs in the first level printer 31b while printing the print data, the first level printer 31b transfers the printing rights to the second level printer 31c in an identical manner to that described for the main printer 31a. Upon receiving the printing rights from the first level printer 31b, the second level printer 31c substitutively starts printing from the first page of the remaining print data that the first level printer 31b could not print because of the error. Meanwhile, at the time of transferring the printing rights, the self printer 31 takes into consideration only the status of the immediate lower level printer 31 while ignoring the status of the immediate higher level printer 31.

If, as shown at (2) in FIG. 9, an error occurs in the second level printer 31c while printing the print data, performs the transfer of printing rights in an identical manner to that described for the main printer 31a. However, because the second level printer 31c is the lowest level printer, the printing rights are transferred to the main printer 31a, which serves as the lower level printer with respect to the second level printer 31c because of the ring topology.

If the self printer 31 is in a non-printable state at the time of receiving the printing rights, then the printing rights are transferred to the corresponding immediate lower level printer 31 in an identical manner to that explained for the case when an error occurs.

In case all of the printers 31 are in a non-printable state, the process of transferring the printing rights enters into an endless loop. One method of preventing the occurrence of such a loop condition is to check whether the self printer 31 that transfers the printing rights for the first time because of its non-printable state receives the printing rights again irrespective of its non-printable state. As soon as the self printer 31 receives the printing rights irrespective of its non-printable state, it can be determined that all of the printers 31 are in the non-printable state and the print server 11 can be notified of the same.

Alternatively, another method is to monitor the status of all the printers 31 in session for a predetermined length of time. If there is no change in the status of any of the printers 31 during the predetermined length of time, then it can be determined that all of the printers 31 are in the non-printable state and the print server 11 can be notified of the same.

On the other hand, if the status of one of the printers 31 changes within the predetermined length of time, then the printing rights can be transferred to that printer 31 such that the printing process resumes.

In this way, according to the first embodiment, a printer can carry out a print job provided it has printing rights. When a printer having printing rights receives a print job including print data and a series of process commands from a host apparatus and prints the print data in accordance with the process commands, synchronization is maintained between the print job that has been stored in the printer having printing rights and the print jobs that have been stored in other printers in session with the printer having printing rights. When the printer having printing rights falls in a non-printable state, the printing rights corresponding to the initiated print job are transferred to one of the other printers in session. Moreover, when a printer in a non-printable state recovers to a printable state and then receives printing rights corresponding to an initiated print job, then the printer can perform printing of the unprinted print data in the initiated print job. Because of such a configuration, it becomes possible to prevent the situation in which a printer that has fallen in a non-printable state is left unattended without being restored to a printable state. Thus, a printer that had fallen in a non-printable state and had transferred the printing rights can resume printing upon being restored to a printable state by the user and upon obtaining the printing rights.

Meanwhile, as a modification of the first embodiment, when an error occurs in the self printer 31 while printing the print data, the self printer 31 can check the status of the immediate higher level printer 31 and, if the immediate higher level printer 31 is in a printable state, transfer the printing rights to the immediate higher level printer 31 by issuing a print authorizing command.

Given below is the description with reference to FIGS. 11 and 12 of the network printing system 100 according to a second embodiment of the present invention. The configuration of the network printing system 100 according to the second embodiment that is identical to the configuration described in the first embodiment is referred to by the same reference numerals and the description is not repeated for clarity.

The second embodiment differs from the first embodiment in the fact that the printing rights are transferred in response to a request from a printer that has been restored in a printable state from a non-printable state.

Figure 12A:
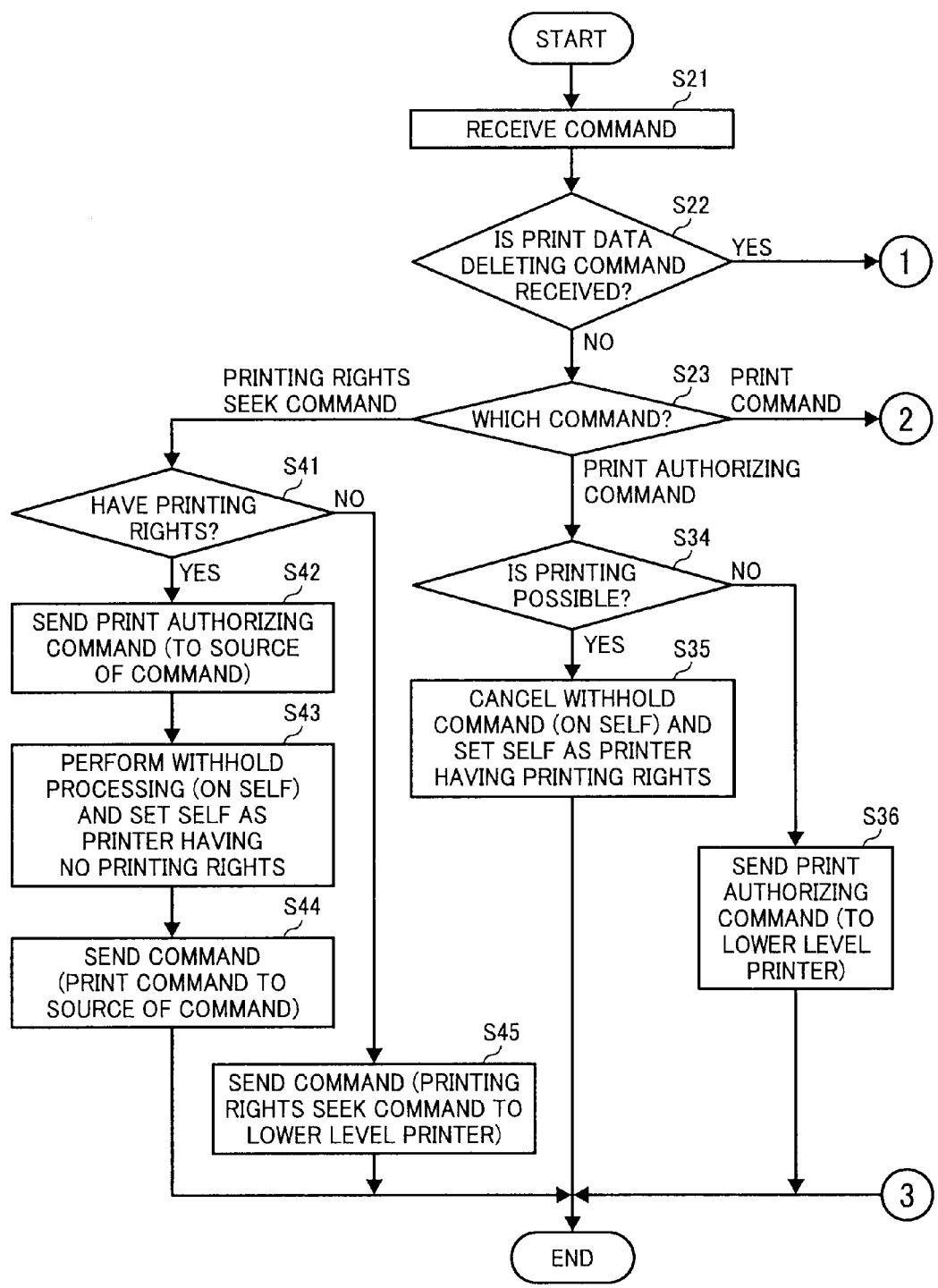
FIGS. 12A and 12B are flowcharts for explaining an exemplary substitutive printing process according to the second embodiment when an error occurs in more than one printer while printing print data.
Figure 12B:
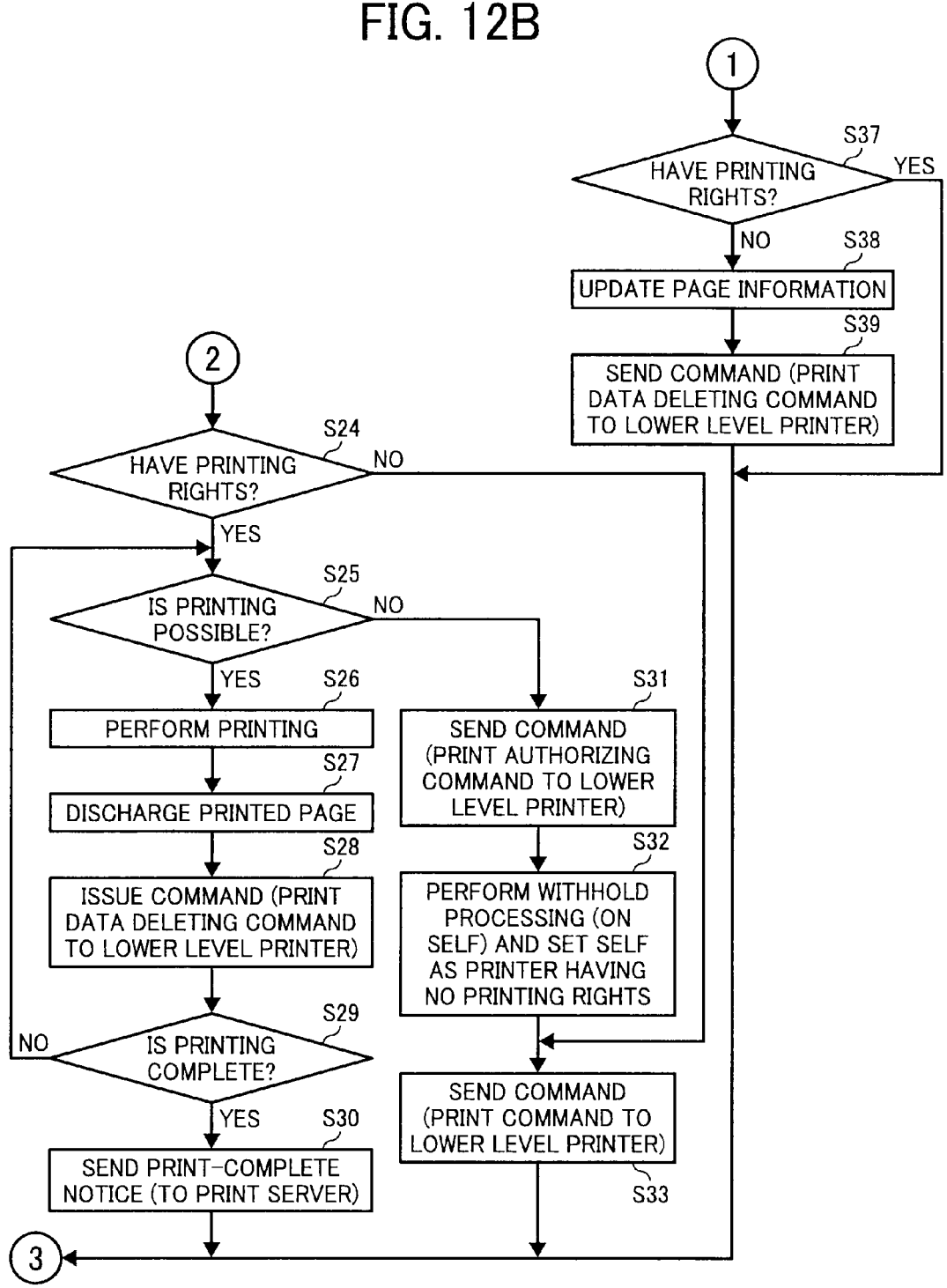

FIG. 11 is a sequence diagram for explaining an exemplary sequence of operations according to the second embodiment in transferring printing rights in case of an error. FIGS. 12A and 12B are flowcharts for explaining an exemplary substitutive printing process according to the second embodiment when an error occurs in more than one printer while printing print data.

Assume that, as shown in FIG. 11, the first level printer 31b receives a printing rights seek command from the main printer 31a (Step S21, No at Step S22, and "printing rights seek command" at Step S23 in FIG. 12A) and when the first level printer 31b is determined to have the printing rights (Yes at Step S41), then the first level printer 31b transfers the printing rights to the main printer 31a by sending a print authorizing command (Step S42) and issues a withhold command to itself, withholds printing thereafter, and sets itself as the printer having no printing rights (Step S43). Subsequently, the first level printer 31b sends a print command to the main printer 31a (Step S44).

When the first level printer 31b is determined not to have the printing rights (No at Step S41), it forwards the printing rights seek command to the second level printer 31c (Step S45).

Thus, according to the second embodiment, if an error occurs in the main printer 31 while printing the print data, the main printer 31 aborts printing of the print data, withholds printing thereafter, and performs the transfer of printing rights. For that, firstly, the main printer 31 issues a print authorizing command to the immediate lower level printer 31 and, secondly, issues a withhold command to itself and withholds printing thereafter.

Because the deleted data corresponding to the printed and discharged pages is maintained in synchronization in all the printers 31, the immediate lower level printer 31 that receives the printing rights from the main printer 31 can substitutively start printing from the first page of the remaining print data that the main printer 31 could not print because of the error.

Herein, if, as shown at (1) in FIG. 11, if the error in the main printer 31a is resolved (e.g., setting of paper sheets in case of a paper-out condition) while the first level printer 31b is performing printing, then the main printer 31a issues a printing rights seek command to the first level printer 31b. Subsequently, the first level printer 31b aborts printing of the print data and performs the transfer of printing rights. For that, firstly, the first level printer 31b issues a print authorizing command to the main printer 31a and, secondly, issues a withhold command to itself and withholds printing thereafter.

Because the deleted data corresponding to the printed and discharged pages is maintained in synchronization in each of the main printer 31a, the first level printer 31b, and the second level printer 31c, the main printer 31a that receives the printing rights from the first level printer 31b can substitutively start printing from the first page of the remaining print data that the first level printer 31b did not print.

Meanwhile, upon receiving a printing rights seek command, the self printer 31 need not send response information to the printer 31 that issued the printing rights seek command. Instead, the self printer 31 can include the response as argument information at the time of giving an instruction to the corresponding immediate lower level printer 31.

Given below is the description with reference to FIGS. 13 and 14 of the network printing system 100 according to a third embodiment of the present invention. The configuration of the network printing system 100 according to the third embodiment that is identical to the configuration in the first two embodiments is referred to by the same reference numerals and the description is not repeated for clarity.

According to the second embodiment, the printing rights are transferred in response to a request from a printer that has been restored in a printable state from a non-printable state. In contrast, according to the third embodiment, when a printer falls in a non-printable state while printing print data, the printer checks the status of all connected printers, selects a printer from among printers in printable state as the candidate printer for printing, and transfers the printing rights to the candidate printer for printing by sending a print authorizing command.

Figure 13:
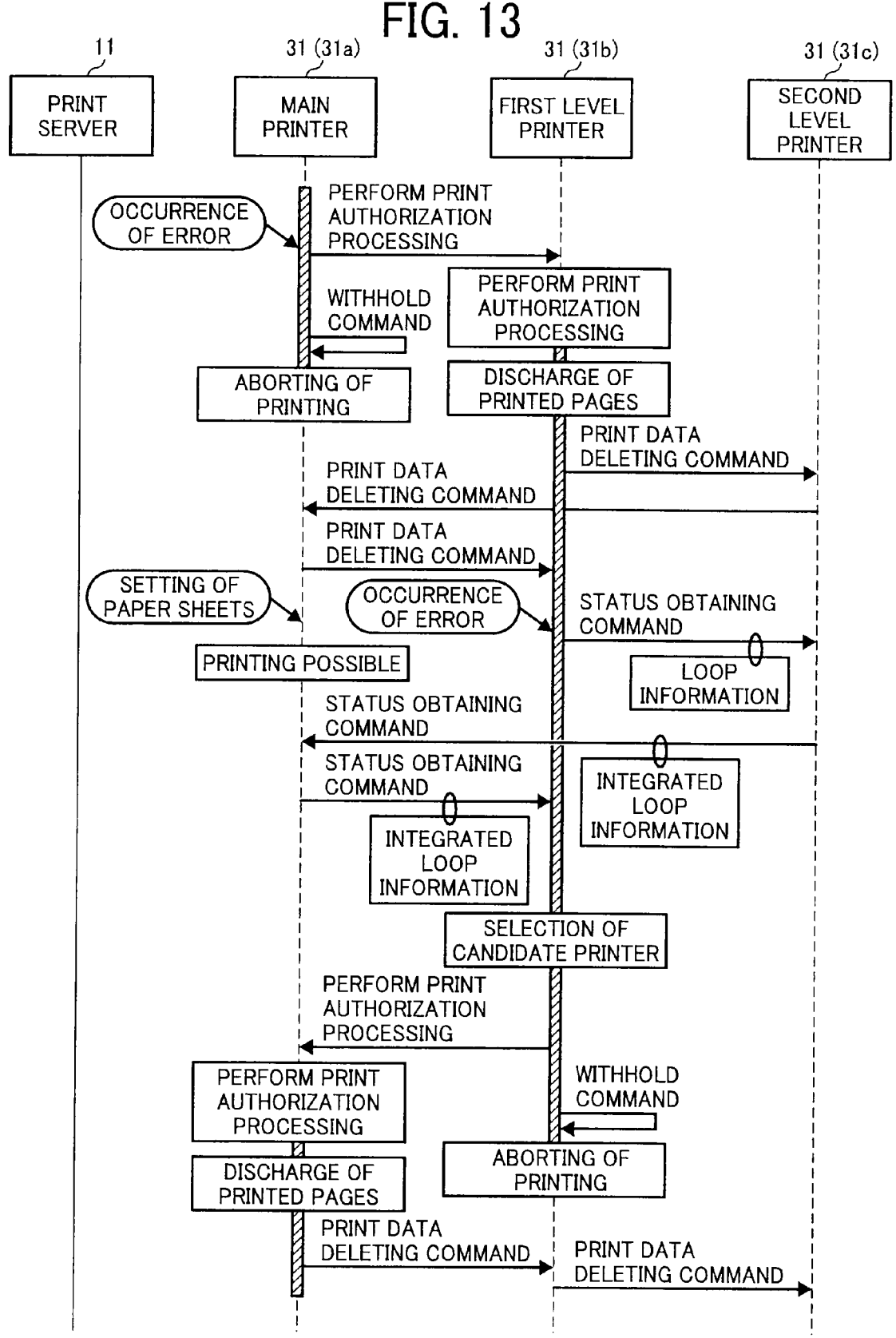
FIG. 13 is a sequence diagram for explaining an exemplary sequence of operations according to a third embodiment of the present invention in transferring printing rights in case of an error.
Figure 14A:
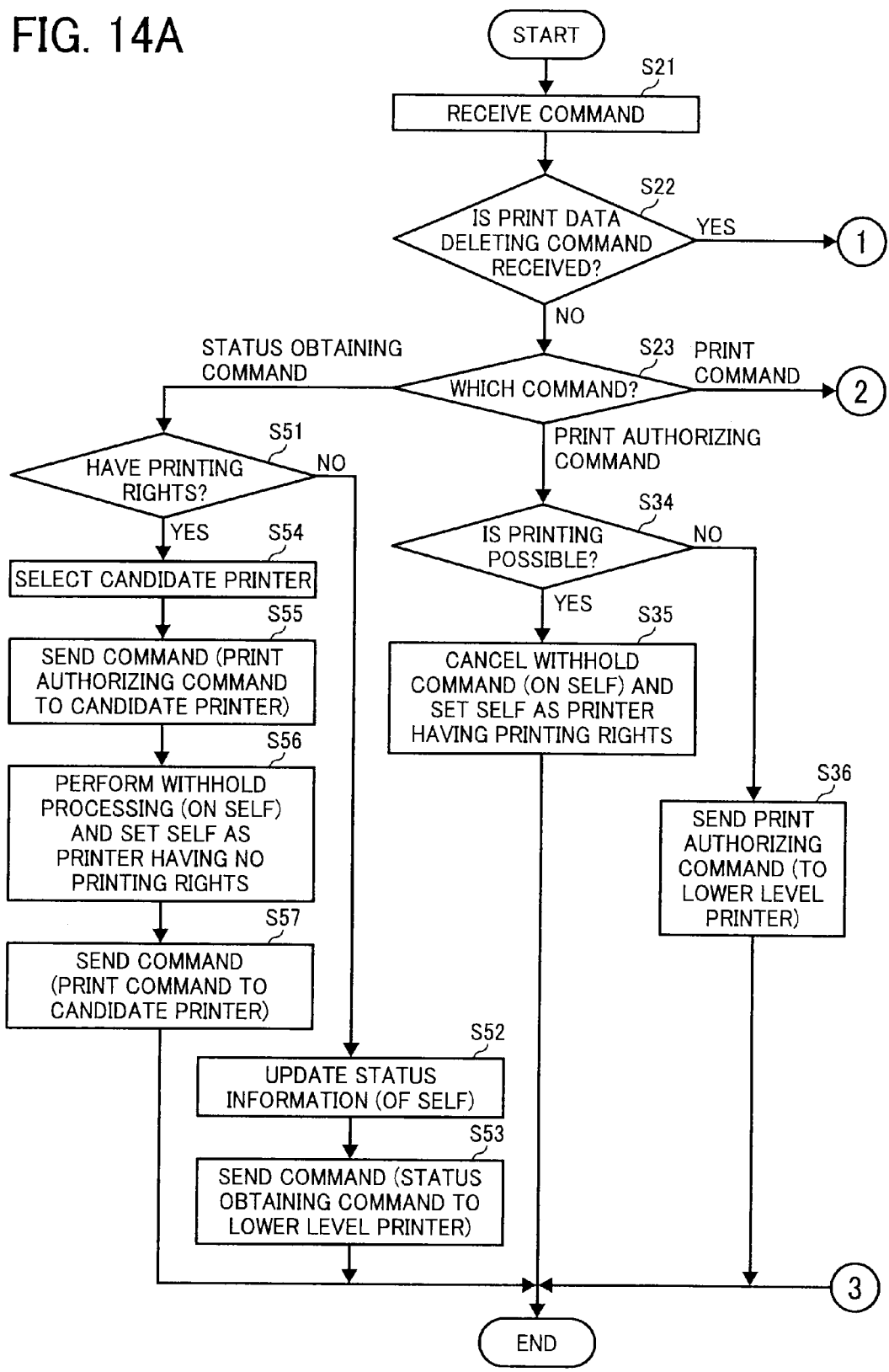
FIGS. 14A and 14B are flowcharts for explaining an exemplary substitutive printing process according to the third embodiment when an error occurs in more than one printer while printing print data.
Figure 14B:
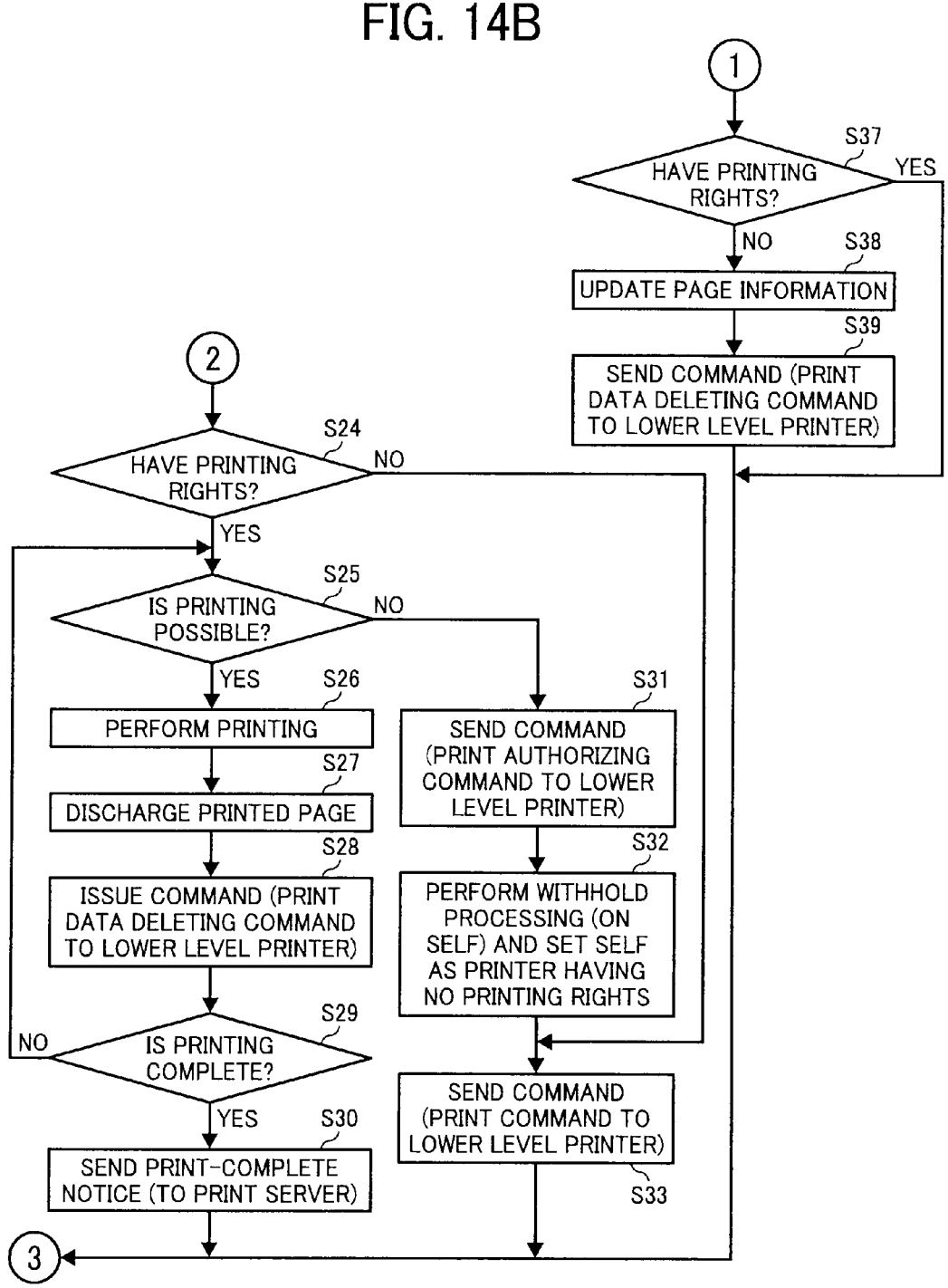
Figure 15:
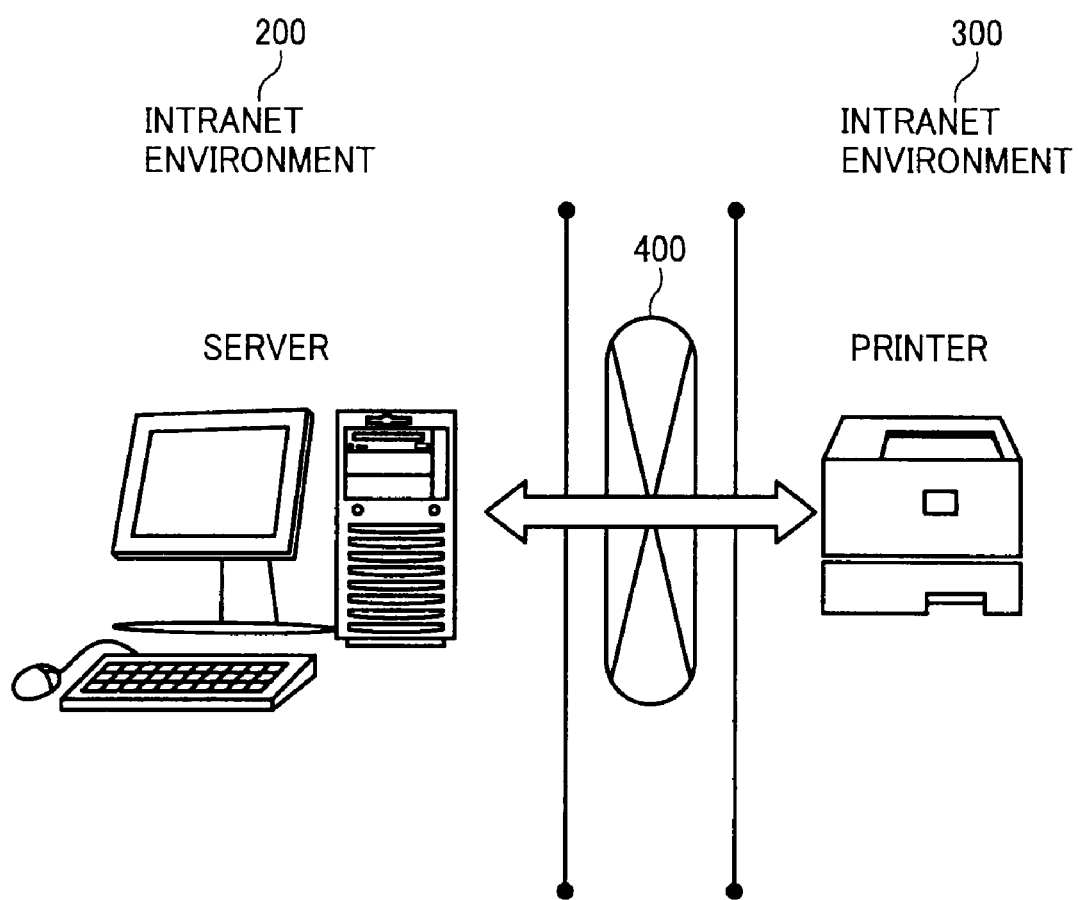
FIG. 15 is a schematic diagram for explaining a conventional network printing system.

FIG. 13 is a sequence diagram for explaining an exemplary sequence of operations according to the third embodiment in transferring printing rights in case of an error. FIGS. 14A and 14B are flowcharts for explaining an exemplary substitutive printing process according to the third embodiment when an error occurs in more than one printer while printing print data.

As shown in FIG. 13, when an error occurs in the first level printer 31b while printing the print data, it issues a status obtaining command to the second level printer 31c.

Upon receiving the status obtaining command from the first level printer 31b (Step S21, No at Step S22, and "status obtaining command" at Step S23 in FIG. 14A), the second level printer 31c determines whether it has the printing rights (Step S51) and, if the second level printer 31c does not have the printing rights (No at Step S51), updates status information of its own (Step S52), adds its own IP address to the loop information, and sends the updated loop information and a status obtaining command to the main printer 31a, which serves as the lower level printer 31 with respect to the second level printer 31c because of the ring topology (Step S53).

Upon receiving the status obtaining command from the second level printer 31c (Step S21, No at Step S22, and "status obtaining command" at Step S23), the main printer 31a determines whether it has the printing rights (Step S51) and, if the main printer 31a does not have the printing rights (No at Step S51), updates status information of its own (Step S52), adds its own IP address to the loop information, and sends the updated loop information and a status obtaining command to the first level printer 31b (Step S53). In this way, the up-to-date loop information including the IP addresses of the main printer 31a and the second level printer 31c is sent to the first level printer 31b.

Upon receiving the status obtaining command from the main printer 31a (Step S21, No at Step S22, and "status obtaining command" at Step S23), the first level printer 31b determines whether it has the printing rights (Step S51) and, because the first level printer 31b has the printing rights (Yes at Step S51), selects the candidate printer for printing to which the printing rights are to be transferred (Step S54). The candidate printer for printing can be a printer that is equipped with identical hardware options or a printer that has previously carried out the currently-initiated print job.

After selecting the candidate printer for printing (e.g., the main printer 31a shown in FIG. 13), the first level printer 31b transfers the printing rights to the candidate printer for printing by sending a print authorizing command (Step S55) and issues a withhold command to itself, withholds printing thereafter, and sets itself as the printer having no printing rights (Step S56). Subsequently, the first level printer 31b sends a print command to the candidate printer for printing (Step S57).

Meanwhile, during the substitutive printing process, following points can be taken into consideration.

(1) Regarding the Destination to which Printed Pages are Discharged

Assume that the self printer 31 had fallen in a non-printable state and had transferred the printing rights to another printer 31 before being restored to a printable state. In such a case, care needs to be taken to prevent a mix-up in the newly printed pages printed after the self printer 31 is restored to a printable state and the previously printed pages printed before the self printer 31 fell into a non-printable state.

To avoid the mix-up, the newly printed pages can be discharged to a catch tray that is different than a catch tray used to discharge the previously printed pages, provided the self printer 31 is equipped with more than one catch trays.

However, if the self printer 31 is equipped with only one catch tray, then the user can be prompted to remove the already-discharged pages before discharging the newly printed pages.

(2) Regarding the Timing of Transferring Printing Rights

If the self printer 31 falls in a non-printable state while printing print data, then one method is to immediately transfer the printing rights corresponding to the initiated print job to another printer 31. However, alternatively, another method can be to set a predetermined wait time before transferring the printing rights to another printer 31. For example, the wait time can be a power-saving standby time, which is the time period for which the self printer 31 waits for a user operation and switches to a power saving mode in case of no user operation. Moreover, the wait time can be set only in the daytime when it is more likely that the user restores the self printer 31 to a printable state and not in the nighttime when it is less likely that the self printer 31 is restored to a printable state.

In this way, according to an aspect of the present invention, it becomes possible to prevent the situation in which a printer that has fallen in a non-printable state is left unattended without being restored to a printable state. Thus, a printer that had fallen in a non-printable state and had transferred the printing rights can resume printing upon being restored to a printable state by the user and upon obtaining the printing rights.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing device that is configured to connect to a host apparatus and at least one other printing device via a network and executes a printing process of a print job including at least one print data and a series of process commands from the host apparatus, the printing device comprising:
   a session setup unit that sets up a session with the host device and the at least one other printing device;
   a printing processing unit that executes the printing process, provided that the printing device has a printing right for the print job; and
   a job synchronizing unit that maintains, upon executing the printing process, a synchronization of the print job with the at least one other printing device that is in session with the printing device, wherein
   when the printing device is in a state in which the printing process cannot be executed, the printing processing unit transfers the printing right corresponding to the print job that is left unprinted to one of the at least one other printing device,
   when the printing device is in a state in which the printing process can be executed and if the printing right corresponding to the print job that is left unprinted is transferred to the printing device from one of the at least one other printing device, the printing processing unit executes the printing process, and
   when the printing device receives a printer occupation command from the host apparatus, the printing device sets itself as having the printing right for the print job and transmits a command to withhold the at least one other printing device having a lower hierarchical status in relation to the printing device from printing.

2. The printing device according to claim 1, wherein, when the printing device is in the state in which the printing process can be executed and the printing device does not have the printing right for the print job, the printing processing unit makes a request for the printing right to one of the at least one other printing device, and upon the other printing device sending the printing right in response to the request, receives the printing right from the other printing device.

3. The printing device according to claim 2, wherein, upon receiving a request for the printing right from the one of the at least one other printing device, the printing processing unit includes response information to the request with an instruction to the one of the at least one other printing device located at a lower level without sending a response to the request to the one of the at least one other printing device that made the request.

4. The printing device according to claim 1, wherein the printing processing unit selects one of the at least one other printing device located at a lower level as a destination for the printing right.

5. The printing device according to claim 4, wherein, provided that the printing device is connected in a ring topology network, if the printing device is located at a lowest level, the printing processing unit selects one of the at least one other printing device located at a highest level as the destination for the printing right.

6. The printing device according to claim 1, wherein the printing processing unit selects one of the at least one other printing device located at a higher level as a destination for the printing right.

7. The printing device according to claim 6, wherein, provided that the printing device is connected in a ring topology network, if the printing device is located at a highest level, the printing processing unit selects the one of the at least one other printing device located at a lowest level as the destination for the printing right.

8. The printing device according to claim 1, wherein when the printing device is in the state in which the printing process cannot be executed, the printing processing unit checks a status of the at least one other printing device, selects a destination for the printing right from among the at least one other printing device that are in states in which the printing process can be executed.

9. The printing device according to claim 1, wherein when the printing device recovers to the state in which the printing process can be executed after transferring the printing right to one of the at least one other printing device and when the printing processing unit receives the printing right corresponding to the print job that is left unprinted from the one of the at least one other printing device and executes the printing process, provided that the printing device includes a plurality of discharging destinations, the printing processing unit switches between the discharging destinations before and after the printing device recovers to the state in which the printing process can be executed.

10. The printing device according to claim 1, wherein when the printing device recovers to the state in which the printing process can be executed after transferring the printing right to one of the at least one other printing device and when the printing processing unit receives the printing right corresponding to the print job that is left unprinted from the one of the at least one other printing device and executes the printing process, the printing processing unit informs a message to remove discharged sheets from a discharging destination.

11. The printing device according to claim 1, wherein when the printing device is in the state in which the printing process cannot be executed, the printing processing unit waits for a predetermined time before transferring the printing right to the one of the at least one other printing device.

12. The printing device according to claim 11, wherein the printing processing unit varies the predetermined time.

13. The printing device according to claim 1, wherein, after printing a page of the print job, the printing device transmits a print data deleting command to the at least one other printing device to cause the at least one other printing device to delete a part of print data corresponding to the printed page.

14. A printing system that includes at least two printing devices including a first printing device and a second printing device being connected via a network and executing a printing process of a print job including at least one print data and a series of process commands from a host apparatus, the printing system comprising:
- a session setup unit that sets up a session between the host apparatus and the printing devices connected to the host apparatus;
- a printing processing unit that executes the printing process on the first printing device, provided that the first printing device has a printing right for the print job; and
- a job synchronizing unit that maintains, upon executing the printing process on the first printing device, a synchronization of the print job with the second printing device that is in session with the first printing device, wherein
- when the first printing device is in a state in which the printing process cannot be executed, the printing processing unit transfers the printing right corresponding to the print job that is left unprinted to the second printing device,
- when the first printing device is in a state in which the printing process can be executed and if the printing right corresponding to the print job that is left unprinted is transferred to the first printing device from the second printing device, the printing processing unit executes the printing process on the first printing device, and
- when the first printing device receives a printer occupation command from the host apparatus, the first printing device sets itself as having the printing right for the print job and transmits a command to withhold the second printing device from printing.

15. The printing system according to claim 14, wherein, after printing a page of the print job, the first printing device transmits a print data deleting command to the second printing device to cause the second printing device to delete a part of print data corresponding to the printed page.

16. A computer program product comprising a non-transitory computer-usable medium having computer-readable program codes embodied in the medium for controlling a printing device that is connected to a host apparatus and at least one other printing device via a network and executes a printing process of a print job including at least one print data and a series of process commands from the host apparatus, the program codes when executed causing a computer to execute:
- setting up a session with the host apparatus and the at least one other printing device;
- executing the printing process, provided that the printing device has a printing right for the print job; and
- maintaining, upon executing the printing process, a synchronization of the print job with the at least one other printing device that is in session with the printing device, wherein
- when the printing device is in a state in which the printing process cannot be executed, the executing includes transferring the printing right corresponding to the print job that is left unprinted to one of the at least one other printing device,
- when the printing device is in a state in which the printing process can be executed and if the printing right corresponding to the print job that is left unprinted is transferred to the printing device from one of the at least one other printing device, the executing includes executing the printing process, and
- when the printing device receives a printer occupation command from the host apparatus, the printing device sets itself as having the printing right for the print job and transmits a command to withhold the at least one other printing device having a lower hierarchical status in relation to the printing device from printing.

17. The computer program product according to claim 16, wherein, after printing a page of the print job, the printing device transmits a print data deleting command to the at least one other printing device to cause the at least one other printing device to delete a part of print data corresponding to the printed page.

* * * * *